US011606249B1

(12) United States Patent
Sawal et al.

(10) Patent No.: US 11,606,249 B1
(45) Date of Patent: Mar. 14, 2023

(54) SYSTEM AND METHOD FOR COMMUNICATION MANAGEMENT IN DISTRIBUTED SYSTEM

(71) Applicant: Dell Products L.P., Round Rock, TX (US)

(72) Inventors: Vinay Sawal, Fremont, CA (US); Senthil Kumar Ganesan, San Ramon, CA (US); Udhaya Chandran Shanmugam, Santa Clara, CA (US); Kannan Karuppiah, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/579,136

(22) Filed: Jan. 19, 2022

(51) Int. Cl.
*H04L 41/0803* (2022.01)
*H04L 67/10* (2022.01)
*H04L 12/46* (2006.01)
*H04L 41/12* (2022.01)

(52) U.S. Cl.
CPC ...... *H04L 41/0803* (2013.01); *H04L 12/4633* (2013.01); *H04L 41/12* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,864,417 B2 | 1/2018 | Bermudez Rodriguez et al. | |
| 10,660,069 B2* | 5/2020 | Kobayashi | H04L 47/724 |
| 10,986,174 B1* | 4/2021 | Sharma | H04L 12/4641 |
| 11,374,840 B1* | 6/2022 | Zhang | H04L 43/0894 |

(Continued)

FOREIGN PATENT DOCUMENTS

| | | | | |
|---|---|---|---|---|
| WO | WO-0235799 A2 * | 5/2002 | ....... | G06F 17/30194 |

OTHER PUBLICATIONS

Austin House "InfraSolution" Catalog, published by Austin Hughes Electronics Ltd. on Nov. 29, 2020; available online at http://web.archive.org/web/20200810192944/https://www.austin-hughes.com/resource_cat/product-resources/rack-access-resources/.
Wikipedia "Path MTU Discovery" Article, published by Wikipedia on Nov. 19, 2021;available Online at http://web.archive.org/web/20211119214201/https://en.wikipedia.org/wiki/Path_MTU_Discovery.

(Continued)

*Primary Examiner* — Uzma Alam
(74) *Attorney, Agent, or Firm* — Womble Bond Dickinson (US) LLP

(57) ABSTRACT

Methods, systems, and devices for providing computer implemented services using managed systems are disclosed. To provide the computer implemented services, the managed systems and/or communication devices may need to operate in a predetermined manner conducive to, for example, execution of applications that provide the computer implemented services. To manage communications in such systems, a highly available service may, upon changes in topology of a deployment including managed system and communication devices, initiate a cooperative process for determining how to communicate in the deployment. The process may be performed to select a new global maximum transmission unit (MTU). Once selected, the deployment may be reconfigured based on the selected global MTU to limit the size of network data units. The global MTU may be selected to limit network data unit fragmentation, network data unit dropping, and unused space in data transmissions.

20 Claims, 14 Drawing Sheets

(56) References Cited

U.S. PATENT DOCUMENTS

| | | | |
|---|---|---|---|
| 11,374,856 B1* | 6/2022 | Dikshit | H04L 45/245 |
| 11,379,562 B2* | 7/2022 | Tyagi | G06F 11/3409 |
| 2010/0036954 A1* | 2/2010 | Sakata | H04L 12/6418 |
| | | | 709/226 |
| 2015/0082362 A1* | 3/2015 | Hasek | H04N 21/238 |
| | | | 725/96 |
| 2015/0281089 A1* | 10/2015 | Marchetti | H04L 47/125 |
| | | | 370/235 |
| 2016/0270031 A1* | 9/2016 | Sundaresan | H04W 72/30 |
| 2019/0028400 A1* | 1/2019 | Kommula | G06F 9/544 |
| 2020/0218571 A1* | 7/2020 | Chen | G06F 9/5027 |
| 2020/0344084 A1* | 10/2020 | Shribman | H04L 61/2575 |
| 2021/0409335 A1* | 12/2021 | Zhu | H04L 47/24 |
| 2022/0006749 A1* | 1/2022 | Momchilov | H04L 49/9057 |
| 2022/0210070 A1* | 6/2022 | Brar | H04L 47/12 |

OTHER PUBLICATIONS

Tripplite "Rack Basics: Everything You Need to Know Before You Equip Your Data Center" Article, published on May 15, 2021; available online at http://web.archive.org/web/20210515085036/https://www.tripplite.com/support/rack-cabinet-basics-selection-installation-cooling.

* cited by examiner

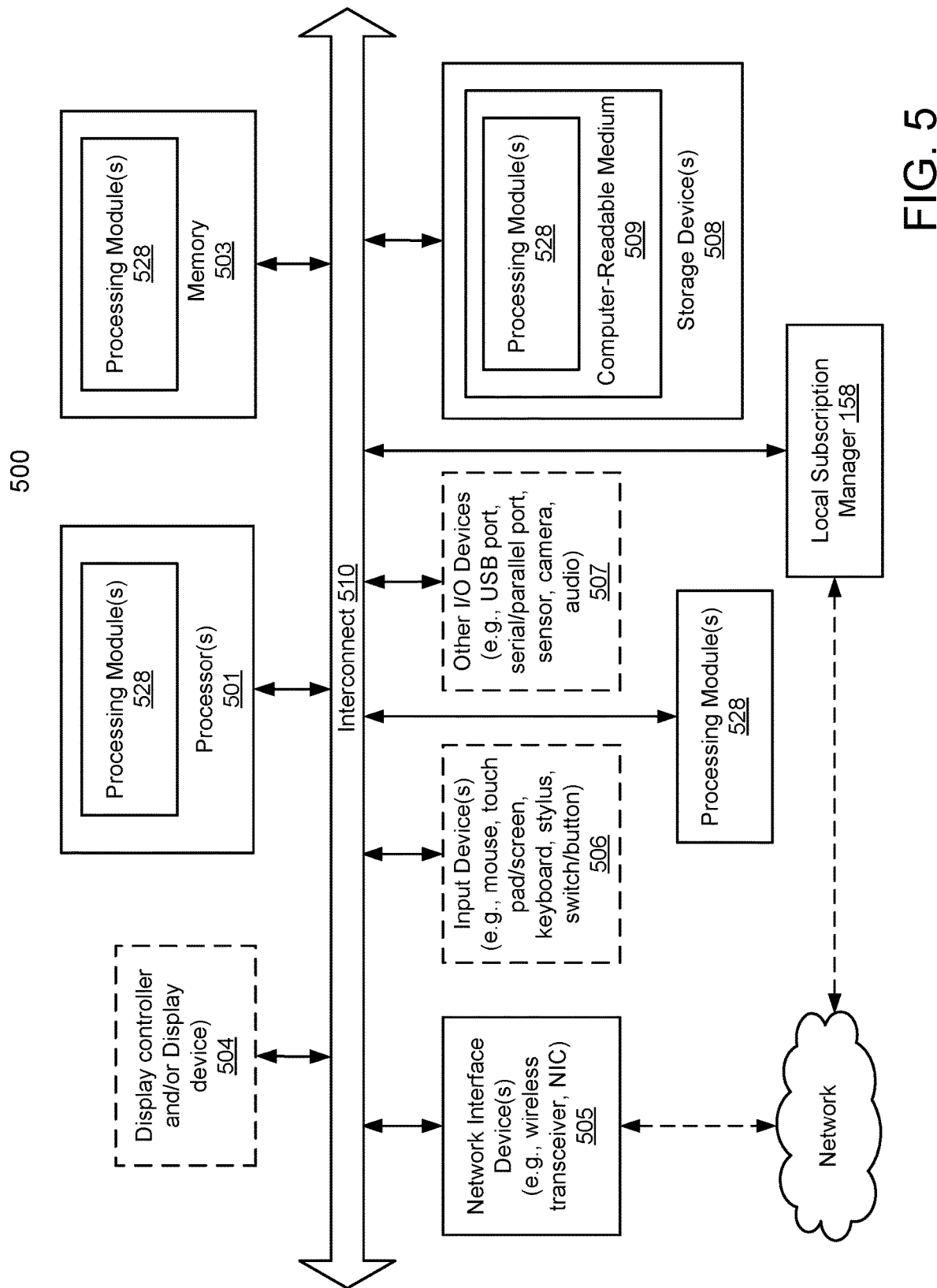

SYSTEM AND METHOD FOR COMMUNICATION MANAGEMENT IN DISTRIBUTED SYSTEM

FIELD DISCLOSED HEREIN

Embodiments disclosed herein relate generally to system management. More particularly, embodiments disclosed herein relate to systems and methods to manage communication in distributed systems.

BACKGROUND

Computing devices may provide various services. For example, computing devices may host applications that store data, process data, and generate data thereby providing services. Depending on the type of processing performed, hardware and software components available for use in processing, various types of services may be performed.

BRIEF DESCRIPTION OF THE DRAWINGS

Embodiments disclosed herein are illustrated by way of example and not limitation in the figures of the accompanying drawings in which like references indicate similar elements.

FIG. 5 shows a block diagram illustrating a computing device in accordance with an embodiment.

DETAILED DESCRIPTION

Figure 1A:
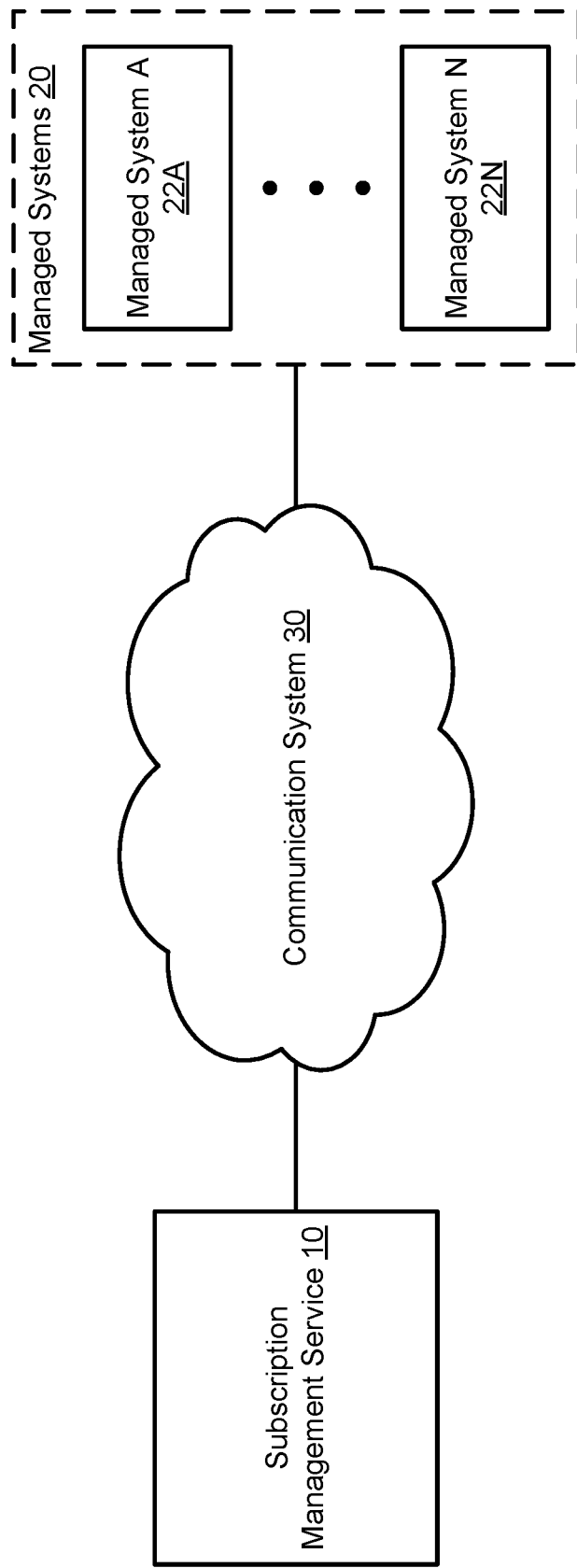
FIG. 1A shows a block diagram illustrating a system in accordance with an embodiment.

Various embodiments disclosed herein will be described with reference to details discussed below, and the accompanying drawings will illustrate the various embodiments. The following description and drawings are illustrative disclosed herein and are not to be construed as limiting the disclosed embodiments. Numerous specific details are described to provide a thorough understanding of various embodiments disclosed herein. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment disclosed herein. The appearances of the phrase "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods, systems, and devices for providing computer implemented services using managed systems. The computer implemented services may include any quantity and type of such services.

To provide the computer implemented services, the managed systems and/or communication devices may need to operate in a predetermined manner conducive to, for example, execution of applications that provide the computer implemented services and data transmissions for the computer implemented services.

To improve the likelihood of the computer implemented services being provided, embodiments disclosed here relate to methods and systems for managing managed systems, communication devices, and deployments using a subscription based model. The subscription model may utilize a highly accessible service to obtain information regarding desired capabilities (e.g., a subscription) of a managed system, use the acquired information to automatically deploy, configure, and manage the features and capabilities of managed systems and communication devices to meet those desired by users, operators, and/or other persons, and facilitate usage based management of the managed systems.

To manage communications in such systems, the highly available service may, upon changes in topology of a deployment, initiate a cooperative process for determining how to communicate in the deployment. The process may be performed to select a new global maximum transmission unit (MTU). Once selected, the deployment may be reconfigured based on the selected global MTU to limit the size of network data units.

The global MTU may be selected to limit network data unit fragmentation, network data unit dropping, and unused space in data transmissions. By doing so, the managed systems may be more likely to be able to provide the computer implemented services actually desired by users over time by improving the efficiency of communications in deployments.

In an embodiment, a computer-implemented method for managing a distributed system managed via subscriptions is provided. The method may include obtaining, by a subscription manager of the distributed system, a subscription update request from a subscribed entity that receives computer implemented services from the distributed system, the subscription update request indicating deployment of additional resources for the distributed system; deploying, by the subscription manager and based on the subscription update request, one or more managed systems and one or more communication devices as the additional resources; prior to providing the computer implemented services using the deployed one or more managed systems and one or more communication devices: initiating, by the subscription manager, cooperative communication limits analysis for the one or more managed systems and the one or more communication devices to identify a global maximum transmission unit, and configuring the one or more managed systems and the one or more communication devices to communicate based on the global maximum transmission unit; and providing the computer implemented services to the subscribed entity using, in part, communications generated by the configured one or more managed systems and the one or more communication devices to comply with the subscription update request.

The cooperative communication limits analysis may include initiating, by a portion of the one or more managed systems and the one or more communication devices, calculation of a largest supported maximum transmission unit based, at least in part, on overhead of a communication scheme used to transmit the communications; advertising, by the portion, the largest supported maximum transmission unit calculated by each device of the portion; and selecting, by the portion, one of the respective largest supported maximum transmission units that is supported by all devices of the portion as the global maximum transmission unit. The portion may include virtual tunnel endpoint devices, the virtual tunnel endpoint devices providing connectivity between layer two networks that service corresponding portions of the one or more managed systems, and the virtual tunnel endpoint devices comprising at least one of the one or more communication devices. The overhead may be a quantity of data used to encapsulate layer two network data units transmitted between the virtual tunnel endpoint devices.

The respective largest supported maximum transmission units may be based on the overhead and a maximum transmission unit size supported by a network interconnecting at least two of the virtual tunnel endpoint devices.

Configuring the one or more managed systems and the one or more communication devices to communicate based on the global maximum transmission unit may include limiting network data processors of the portion to only transmit network data units that are equal to or smaller than the global maximum transmission unit.

The global maximum transmission unit may allow the virtual tunnel endpoint devices to encapsulate network data units of a size of the global maximum transmission unit or smaller, and transmit the encapsulated network data units from the one or more managed systems without fragmentation and/or rejection by a transport network interconnecting the virtual tunnel endpoint devices.

The respective largest supported maximum transmission units may be advertised using provider multicast service interface route advertisement.

The respective largest supported maximum transmission units are advertised via link layer discovery protocol (LLDP) communications.

Providing the computer implemented services to the subscribed entity using, in part, the communications generated by the configured one or more managed systems and the one or more communication devices to comply with the subscription update request may include generating and transmitting network data units of uniform size corresponding to the global maximum transmission unit, the network data units comprises data used to facilitate the computer implemented services.

In an embodiment, a non-transitory media may include instructions that when executed by a processor cause the computer-implemented method to be performed is provided.

In an embodiment, a data processing system may include the non-transitory media and a processor, and may perform the computer-implemented method when the computer instructions are executed by the processor is provided.

Turning to FIG. 1A, a block diagram illustrating a system in accordance with an embodiment is shown. The system may provide for automated management of one or more managed systems 20. A managed system may include any number of computing devices that may each include any number of hardware components (e.g., processors, memory modules, storage devices, communication devices, special purposes devices such as accelerators/graphics processing units/application specific integrated circuits, controllers, etc.). The hardware components may support execution of any number and types of applications (e.g., software components). The aggregate operation of all, or a portion, of the hardware components and software components may give rise to an integrated solution, platform, service, etc. able to provide desired computer implemented services.

The computer implemented services may include any number and type of computer implemented services. Computer implemented services may include, for example, database services, data processing services, electronic communication services, and/or any other services that may be provided using one or more computing devices. Other types of computer implemented services may be provided by managed systems 20 without departing from embodiments disclosed herein.

Figure 1B:
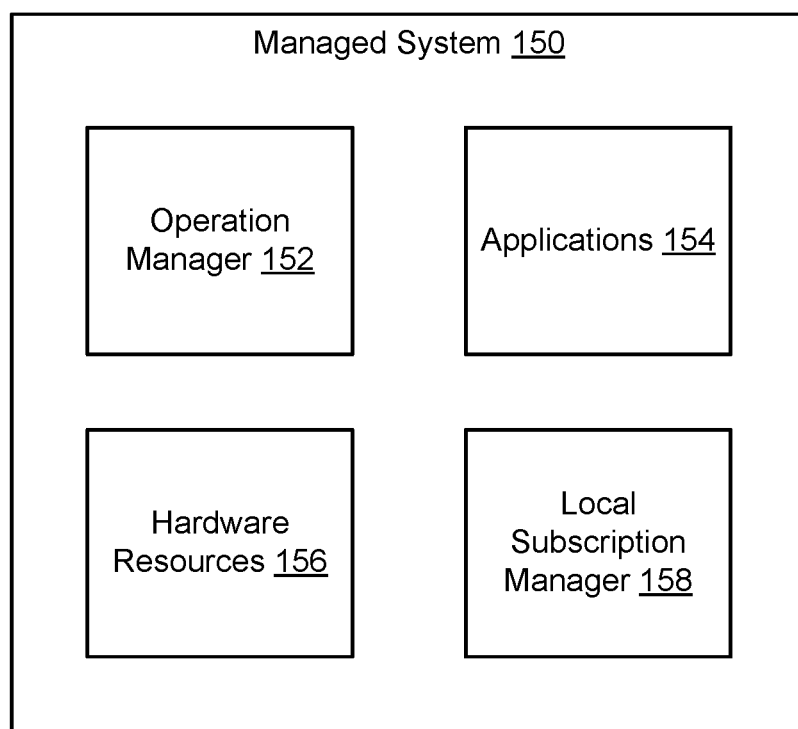
FIG. 1B shows a block diagram illustrating a managed system in accordance with an embodiment.

To provide the aforementioned computer implemented services, any of managed systems 22A, 22N may need to operate in a predetermined manner. For example, certain hardware components may need to be operational and/or certain software components (e.g., applications) may need to be operating for the managed systems to provide computer implemented services (e.g., to operate as a solution). Similarly, managed systems 22A-22N may need certain levels of operably connectivity provided by one or more networks and/or communication protocols. Different configurations of the hardware components, software components, and/or communication capabilities may need to be implemented by managed systems 20 depending on the computer implemented services desired to be provided by the respective managed systems. Refer to FIG. 1B for additional details regarding managed systems 20.

However, determining these configurations of hardware components, software components (e.g., applications), and/or communication capabilities necessary for corresponding computer implemented services may be technically challenging to identify. For example, a person may need to be familiar with a range of hardware and software components issues to effectively select the hardware components and/or software components of a system so that the system is capable of providing the desired computer implemented services. Similarly, a person may need to be familiar with a range of different communication devices, protocols, and/or other features of communication devices to select and deploy such devices to provide necessary communication capabilities. Further, if a system is procured that lacks necessary hardware components, software components, and/or communication capabilities, then the procured system may not be able to provide its desired functions.

In general, embodiments disclosed herein relate to system, devices and methods for deploying and managing one or more managed systems and/or communication devices in a manner that may improve the likelihood of the managed systems being able to provide desired computer implemented services. To do so, a system in accordance with embodiments disclosed herein may provide a distributed system for automatically deploying and configuring the operation of managed systems and communication devices to support desired computer implemented services. By doing so, embodiments disclosed herein may (i) reduce the cognitive burden for selecting and managing systems to provide desired computer implemented services, (ii) may improve the uptime of desired computer implemented services by making it more likely that managed systems are able to provide the desired services over time, and/or (iii) reducing the cost of obtaining desired computer implemented services by dynamically enabling and/or disabling only those functions/components (which may have associated cost for such functions) necessary to provide the desired computer implemented services.

To provide the above noted functionality, a system in accordance with an embodiment may include subscription management service 10. Subscription management service 10 may facilitate automatic deployment and configuration of managed systems 20 and communication devices (not shown, refer to FIG. 1E for additional details). To do so, subscription management service 10 may (i) obtain information indicating desired functions of one or more of managed systems 20 and/or hardware components of managed systems 20 to be enabled and/or disabled (and/or information indicating corresponding periods of time of enablement/disablement of hardware/software components), (ii) correlate the desired functions with various hardware components (e.g., if explicit hardware components identifications are not made) and/or software components, (iii) deploy managed systems and/or communication devices to meet the correlated hardware and/or software components necessary for the desired functions, and (iv) provide local subscription managers hosted by managed systems 20 with information regarding the identified hardware components, software components, periods of enablement/disablement, and/or other information to allow the local subscription managers to configure managed systems 20 in a manner that conforms to the information (e.g., subscriptions) obtained by subscription management service 10. In this manner, a user or manager of managed systems 20 may configure managed systems 20 without needing to directly interact with the various hardware and/or software components of managed systems 20.

Further, the distributed system may allow a provider of managed systems 20 to selectively manage various functionalities provided by managed systems 20. By doing so, a provider of managed systems 20 may tailor the functions provided by managed systems 20 (e.g., from all possible functions) to only those requested, desired, and/or procured by an operator, manager, and/or user of managed systems 20.

For example, consider a scenario where a provider of a managed system does so on a contractual basis where a user of the managed system agrees to purchase subscriptions for various functionalities, hardware components, and/or software components. The user may use subscription management service 10 to select to which of the aforementioned features the user wishes to have enabled, to the extent of such enablement, durations of enablement, etc. The contractual basis may be, for example, durations of time, use of certain quantities of resources such as processor cycles, storage space, etc. and/or aggregate services provided by one or more managed systems.

To allow for users or other persons associated with managed systems to elect into such subscriptions, subscription management service 10 may provide graphical user interfaces that allow such selections to be made. The graphical user interfaces may be implemented, for example, as webpages accessible to the users or other persons via other devices (e.g., client devices not illustrated in FIG. 1A but may be operably connected to subscription management service 10 via communication system 30). When an election is made, subscription management service 10 may record the election and send information regarding the elected subscriptions to local subscription managers hosted by managed systems 20 and/or deploy additional managed systems and/or communication device. Once sent, the local subscription managers may modify the operation of managed systems 20 (and/or newly deployed devices) such that the operation of managed systems 20 matches the elections received and/or recorded by subscription management service.

When providing the aforementioned information regarding subscription elections to local subscription managers, subscription management service 10 may also provide (e.g., collectively "subscription management information"): (i) code blocks or other information (e.g., lists of actions) usable to modify the operation of a managed system to comply with an elected subscription, (ii) limitations on elected subscriptions (e.g., subscription durations, quantities of operations that may be performed under a subscriptions, and/or other metrics for quantifying operation of managed systems 20 limited by a subscription limitation), and/or (iii) code blocks or other information (e.g., lists of actions) usable to revert a previously implemented modification of the operation of a managed system to comply with an elected subscription. By providing the local subscription managers with subscription management information, the local subscription managers may independently enforce the terms of elected subscriptions on managed systems even when, for example, one or more of the local subscription managers are unable to communicate with subscription management service 10 (e.g., after receiving the subscription management information).

In addition to configuring managed systems 20 to provide desired services, the managed systems and communication devices may be configured to facilitate efficient communications to support the performance of desired computer implemented services. By virtue of the subscription-based management modality used to manage managed systems 20, the interconnectivity and/or functionality of various managed systems and/or corresponding communication devices may dynamically change over time as subscriptions are modified.

To facilitate efficient communications, subscription management service 10 may automatically initiate one or more processes for identifying how the managed systems and communication devices should communicate with one another to improve the efficiency of the communications. For example, subscription management service 10 may initiate a distributed process for identifying, selecting, and implementing a maximum transmission unit (MTU) for communications. Once implemented, managed systems 20 may generate and send network data units the comply with the MTU.

The MTU may be selected based on fundamental hardware limits and/or various communication protocols used to facilitate data transmission. For example, managed systems 20 may communicate with one another, in part, using virtualized networks. The virtualized network may use network tunnels to distribute layer two network data units (e.g., Ethernet datagrams, frames, etc.) between layer two networks (e.g., that are not connected to one another via layer two data links) include various portions of managed systems 20. The network tunnels may encapsulate the layer two network data units to facilitate transmission between various layer two networks using higher layer network (e.g., internet protocol networks). Consequently, various components of managed systems 20 may add control data to various network data units.

If the added control data in combination with the exist control and payload data of a layer two network data units exceed a network data unit transmission size limit, then network data unit fragmentation may occur. Network data unit fragmentation may decrease communication efficiently by incurring use of additional control data (e.g., for divided data units). However, if the added control data in combination with the exist control and payload data of a layer two network data units are much smaller than the network data unit transmission size limit, the overhead (e.g., ratio of control data to payload data) may be large thereby causing inefficient communication. The processes performed by subscription management service may identify and enforce network data unit MTUs that result in network data units that do not cause communication inefficiency. For additional details regarding subscription management service 10, refer to FIG. 1D.

By doing so, embodiments disclosed herein may provide a distributed system management model that is resilient to various failure modes (e.g., operation failures, communication failures, etc.) in distributed systems while ensuring efficient communications. Consequently, the disclosed distributed systems may efficiently provide computer implemented services to users by avoiding undesired distributed system communication overhead.

Any of subscription management service 10 and managed systems 20 may be implemented with a computing device such as a host or server, a personal computer (e.g., desktops, laptops, and tablets), a "thin" client, a personal digital assistant (PDA), a Web enabled appliance, or a mobile phone (e.g., Smartphone), and/or any other type of data processing device or system. For additional details regarding computing devices, refer to FIG. 5.

In an embodiment, one or more of subscription management service 10 and managed systems 20 are operably connected via communication system 30. Communication system 30 may allow any of subscription management service 10 and managed systems 20 to communicate with one another (and/or with other devices not illustrated in FIG. 1A). To provide its functionality, communication system 30 may be implemented with one or more wired and/or wireless networks. Any of these networks may be a private network (e.g., the "Network" shown in FIG. 5), a public network, and/or may include the Internet. For example, managed systems 20 may be operably connected to subscription management service 10 via the Internet. Subscription management service 10, managed systems 20, and/or communication system 30 may be adapted to perform one or more protocols for communicating via communication system 30.

While illustrated in FIG. 1A with a limited number of specific components, a system may include additional, fewer, and/or different components without departing from embodiments disclosed herein.

Turning to FIG. 1B, a block diagram illustrating managed system 150 in accordance with an embodiment is shown. Managed system 150 may be similar to any of managed systems 20 shown in FIG. 1A. Managed system 150 may provide desired computer implemented service by allowing for its automatic reconfiguration over time based on subscriptions maintained by subscription management service 10, shown in FIG. 1A.

In addition (and/or alternatively) to any of the components shown in FIG. 5, managed system 150 may include operation manager 152, applications 154, hardware resources 156, and local subscription manager 158. Each of these components is discussed below.

Operation manager 152 may generally manage operation of the component of managed system 150, except for local subscription manager 158. For example, operation manager 152 may be implemented with an operating system used to manage hardware resources 156 of managed system 150 to facilitate execution of applications 154. Operation manager 152 may also include, for example, a startup manager such as a basic input output system (BIOS) used to prepare managed system 150 to boot to an operating system or other type of operation management entity. For example, the startup manager may perform various administrative functions such as (i) identifying the hardware resource 156 and (ii) preparing the hardware resources 156 for use. Once prepared, the startup manager may handoff management of managed system 150 to the operating system or other type of management entity to place managed system 150 in a predetermined operating system conducive to applications 154 providing their functionalities. Prior to hand off, managed system 150 may not be in an operating state in which applications 154 may provide all, or a portion, of their functionalities.

Applications 154 may provide all, or a portion, of the computer implemented services desired by a user, operator, or other person associated with managed system 150. Applications 154 may utilize hardware resources 156 to provide their respective functionalities. Operation manager 152 may mediate presentation of hardware resources 156 by, for example, scheduling use, managing discontinuous access, and/or performing other actions to coordinate use of hardware resources 156 by applications 154 (and/or other entities).

In an embodiment, one or more of operation manager 152 and applications 154 is implemented using a hardware device including circuitry. The hardware device may be, for example, a digital signal processor, a field programmable gate array, or an application specific integrated circuit. The circuitry may be adapted to cause the hardware device to perform the functionality of one or more of operation manager 152 and applications 154. One or more of operation manager 152 and applications 154 may be implemented using other types of hardware devices without departing embodiment disclosed herein.

In an embodiment, one or more of operation manager 152 and applications 154 is implemented using a processor adapted to execute computing code stored on a persistent storage that when executed by the processor performs the functionality of one or more of operation manager 152 and applications 154 discussed throughout this application. The processor may be a hardware processor including circuitry such as, for example, a central processing unit, a processing core, or a microcontroller. The processor may be other types of hardware devices for processing information without departing embodiment disclosed herein.

Hardware resources 156 may include any type and quantity of hardware devices usable to provide computer implemented services. Hardware resources 156 may provide their functionality by, for example, consuming power to perform various actions that result in the performance of operation manager 152, applications 154, and/or other entities not shown in FIG. 1B. As part of their respective operation, hardware resources 156 may host firmware and/or may otherwise be programmable to facilitate their respective operation.

In an embodiment, hardware resources 156 include one or more network data unit processors. The network data unit processors may facilitate communications by generating network data units used to transmit information and processing received network data units through which information from other devices may be received.

In an embodiment, the network data unit processors generate network data units by dividing to-be-transmitted data into portions and adding control information to the network portions. The network data unit processors may determine the quantity of data included in each portion based on a global maximum transmission unit. The global maximum transmission unit may specify a maximum size of a network data unit transmitted by the network data unit processor (e.g., including both control and payload data). The global maximum transmission unit may be provided to the network data units processors via, for example, route advertisement, network discovery protocols, and/or other communication schemes.

For example, (all or a portion of) the communication devices that facilitate communications by managed devices may advertise or otherwise communicate the global maximum transmission unit which may specify a finite quantity of data. The global maximum transmission unit may be set such that the network data units generated by managed systems will not be fragment by virtue of encapsulation performed by the communication devices, and are not too small such that communication efficiency is substantially reduced.

In an embodiment, the global maximum transmission unit is set based on the maximum level of encapsulation that network data units will receive (e.g., a finite quantity of bits) and limits on maximum transmission size of transport networks used to transmit encapsulated network data units between layer two (e.g., Ethernet) networks which serve various managed systems. For example, the global maximum transmission unit may be set by identifying the MTU of the transport network and subtracting the maximum quantity of encapsulation (e.g., substantially, a factor of safety may also be subtracted to ensure that the encapsulated network data units do not exceed the MTUs of the transport networks).

The global maximum transmission unit (or information usable to determine it) may be provided to the network data unit processors and may be automatically implemented. For example, the network data unit processors may automatically modify the manner of dividing data into payloads and/or encapsulating the payloads with control information to match the global maximum transmission unit. For example, the global maximum transmission unit may be received from communication devices via one or more protocols such as the link layer discovery protocol (LLDP), provider multicast service interface (PMSI), or other type of communication (e.g., network control/management communications).

Local subscription manager 158 may provide subscription management services. Subscription management services may include (i) obtaining information regarding subscriptions, (ii) performing one or more actions to implement the subscriptions, (iii) storing information regarding the subscriptions in a location accessible to local subscription manager 158, (iv) monitoring operation of managed system 150 based on subscription information (e.g., specified by the information regarding the subscriptions) to obtain, for example, use data, (v) providing use data to the subscription management service, and (vi) based on the monitoring, performing one or more actions to force managed system 150 to comply with the subscriptions (or lack thereof) once managed system 150 may in the future and/or is currently exceeding one or more subscription limitations. The one or more actions to implement the subscriptions may include, for example, (a) activing various deactivated hardware resources, (b) loading various information into storage and/or memory of managed system 150, (c) causing processors or other devices of hardware resources 156 to execute various code blocks to cause them to perform certain operations, and/or (d) any other types of actions to implement changes to managed system 150 to comply with a subscription. Likewise, the one or more actions to force managed system 150 to comply with the subscriptions may include (I) disabling various activated hardware resources, (II) removing various information from storage and/or memory of managed system 150, (III) causing processor or other devices of hardware resources 156 to execute other code blocks to cause them to perform certain operations to revert previous changes to the operation of managed system 150 and/or remove certain functionalities, and/or (IV) any other types of actions to implement changes to managed system 150 to comply with a subscription or lack thereof.

By providing its functionality, local subscription manager 158 may manage the configuration, behavior, and/or functionality of managed system 150 in a manner that automatically conforms it to match that expected by subscription management service 10. As part of the aforementioned process, local subscription manager 158 and subscription management service 10 may cooperate to enforce subscriptions on managed system 150. Local subscription manager 158 and subscription management service 10 may also perform one or more authentications of one another and/or communications from these components to prevent other entities from interfering with the cooperative operation of local subscription manager 158 and subscription management service 10.

In an embodiment, local subscription manager 158 is implemented with an out of band management controller. The out of band management controller may be hosted by managed system 150, be operably connected to hardware resources 156 (e.g., via interconnect 510, shown in FIG. 5), and may operate independently from other components (e.g., hardware and software) of managed system 150. The management controller may include functionality to manage the operation, configuration, and/or other characteristic of any hardware and/or software component of managed system 150. For example, the management controller may include functionality to disable/enable components, reconfigure components, add new components (e.g., load additional applications for execution), etc.

In an embodiment, the management controller includes a separate communication interface (e.g., from that of a communication interface of managed system 150) through which it communicates with subscription management service 10. If a separate communication interface is used that includes a separate network data unit processor, the management controller may match the MTU setting of the separate network data unit processor to match that implemented by the host managed system (or may perform other operations for ensuring that network data units transmitted by the management controller do not disrupt network communications due to fragmentation, dropping, etc.). In an embodiment, the management controller uses the same communication interface which managed system 150 uses to communicate with other devices. Either of these communication interface may facilitate communications with communication system 30, and devices connected to communication system 30.

Figure 1C:
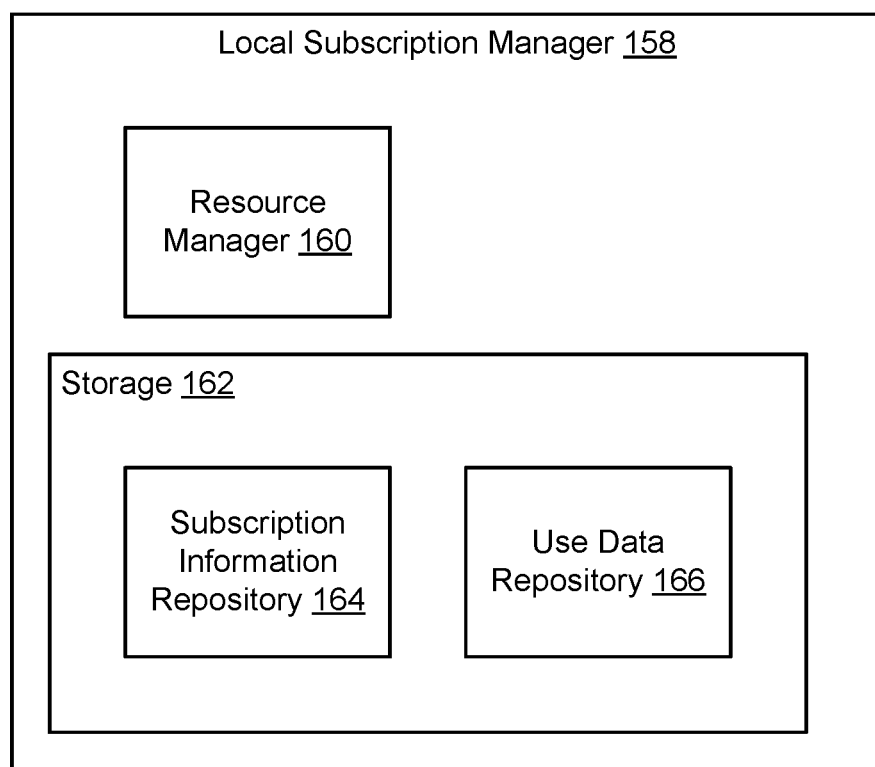
FIG. 1C shows a block diagram illustrating a local subscription manager in accordance with an embodiment.
Figure 2:
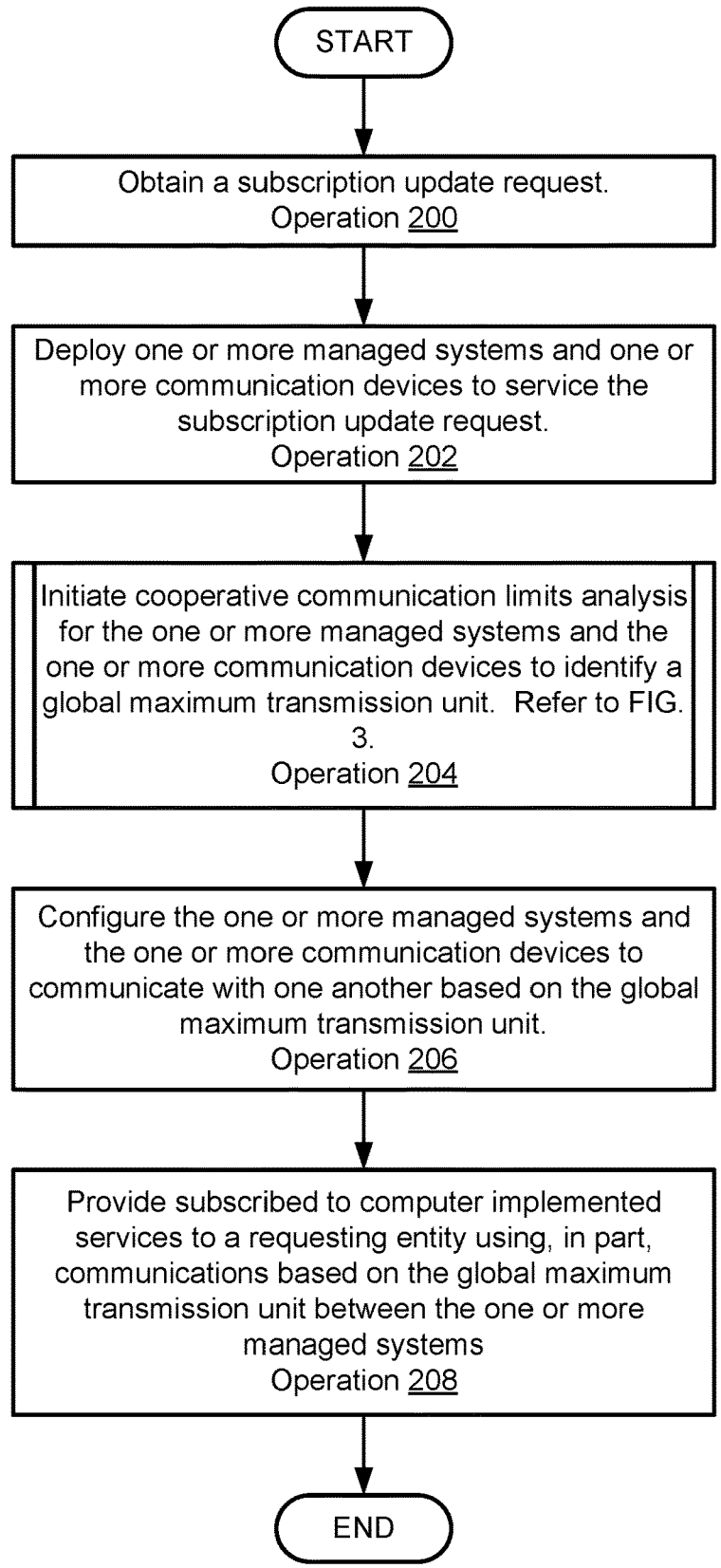
FIG. 2 shows a flow diagram illustrating a method of providing computer implemented services responsive to subscriptions in accordance with an embodiment.
Figure 3:
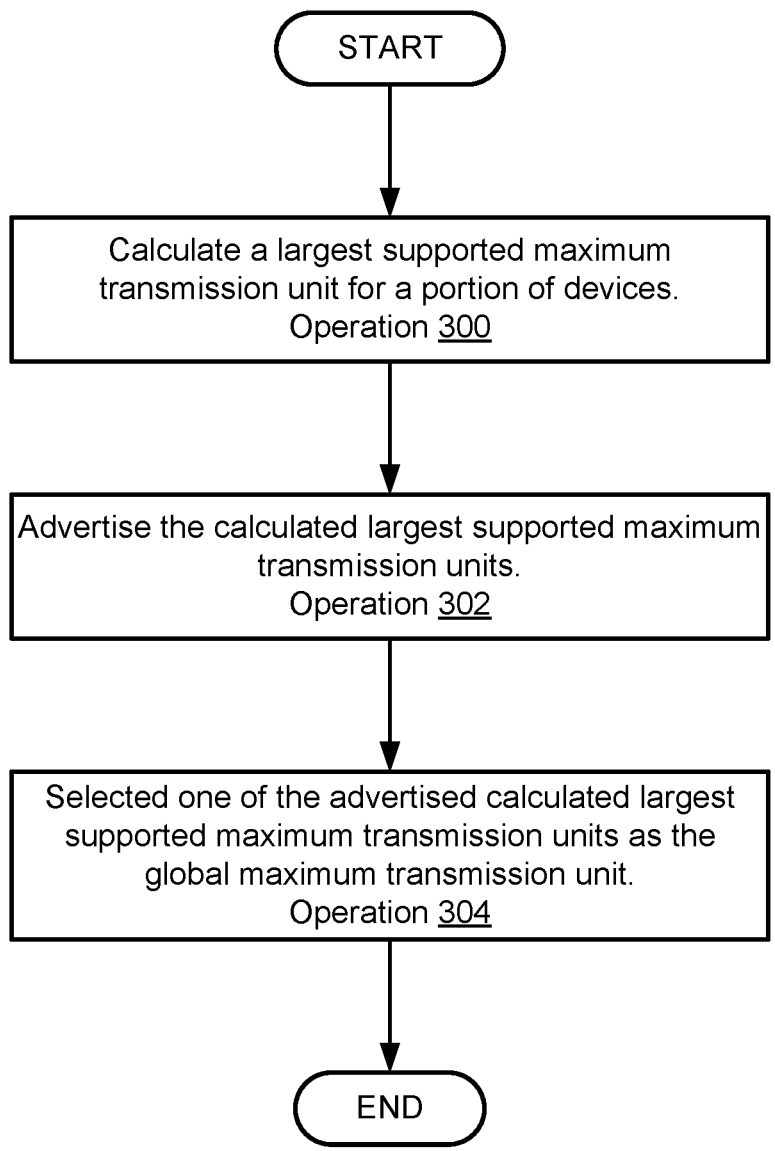
FIG. 3 shows a flow diagram illustrating a method of selecting a global maximum transmission unit in accordance with an embodiment.

When providing its functionality, local subscription manager 158 may perform all, or a portion, of the methods and operations illustrated in FIGS. 2-3 and/or actions shown in and/or described with respect to FIGS. 4A-4F. Refer to FIG. 1C for additional details regarding local subscription manager 158.

While illustrated in FIG. 1B with a limited number of specific components, a managed system may include additional, fewer, and/or different components without departing from embodiments disclosed herein.

Turning to FIG. 1C, a block diagram of local subscription manager 158 in accordance with an embodiment is shown. Local subscription manager 158 may be implemented with a computing device similar to that illustrated in FIG. 5. In addition (and/or alternatively) to any of the components shown in FIG. 5, local subscription manager 158 may include resource manager 160 and storage 162. Each of these components is discussed below.

Resource manager 160 may include functionality to (i) establish secure connections with and/or authenticate subscription management service 10, (ii) obtain information from subscription management service 10 via the secure connections, (iii) update subscription information repository 164 based on the obtained information, (iv) modify the configuration, function, and/or operation of a managed system that hosts local subscription manager 158 to conform to the information stored in subscription information repository 164, (v) monitor use of subscribed to services provided by the host managed system, (vi) report the use of such services provided by the host managed system to the subscription management service, and/or (vii) initiate reconfiguration of network data unit processors and/or participation in cooperative MTU setting processes.

In an embodiment, resource manager 160 is implemented using a hardware device including circuitry. The hardware device may be, for example, a digital signal processor, a field programmable gate array, or an application specific integrated circuit. The circuitry may be adapted to cause the hardware device to perform the functionality of resource manager 160. Resource manager 160 may be implemented using other types of hardware devices without departing embodiment disclosed herein.

In one embodiment, resource manager 160 is implemented using a processor adapted to execute computing code stored on a persistent storage that when executed by the processor performs the functionality of resource manager 160 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 162 is implemented using physical devices that provide data storage services (e.g., storing data and providing copies of previously stored data). The devices that provide data storage services may include hardware devices and/or logical devices. For example, storage 162 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 162 may include a memory device (e.g., a dual in line memory device) in which data is stored and from which copies of previously stored data are provided. In another example, storage 162 may include a persistent storage device (e.g., a solid-state disk drive) in which data is stored and from which copies of previously stored data is provided. In a still further example, storage 162 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 162 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Generally, storage 162, and the data stored therein, may not be accessible to a managed system that hosts local subscription manager 158.

Storage 162 may store data structures including subscription information repository 164 and use data repository 166.

Subscription information repository 164 may be implemented with one or more data structures that store information regarding subscriptions for a device that hosts local subscription manager 158. The information may allow resource manager 160 to enforce various configurations on a host managed system to conform that operation of the host managed system to meet subscription limitations. For example, subscription information repository 164 may include code blocks usable to force a host managed system (e.g., by initiating execution of the code blocks) to enable/disable various hardware components, software components, adopt various configurations, and/or otherwise conform its operation to that necessary for desired computer implemented services to be provided.

Use data repository 166 may be implemented with one or more data structures that store information regarding use of the services provided by the host managed system. The use data may include quantities of services utilized by a user (e.g., absolute quantities, use rates, and/or other types of information regarding use of such services by subscribed entities), quantities of computing resources consumed by services provided to a user, and/or other information usable to quantify use of a host managed system or services provided by the host managed system. The information included in use data repository 166 may be maintained by resource manager 160 which may monitor the operation of a host managed system to obtain the information.

While various data structures have been illustrated and described in FIG. 1C, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1C may be stored remotely to local subscription manager 158 (e.g., in a storage of a host device, a cloud resource, etc.) in a manner that is still accessible to local subscription manager 158.

While illustrated in FIG. 1C with a limited number of specific components, a local subscription manager may include additional, fewer, and/or different components without departing from embodiments disclosed herein.

Figure 1D:
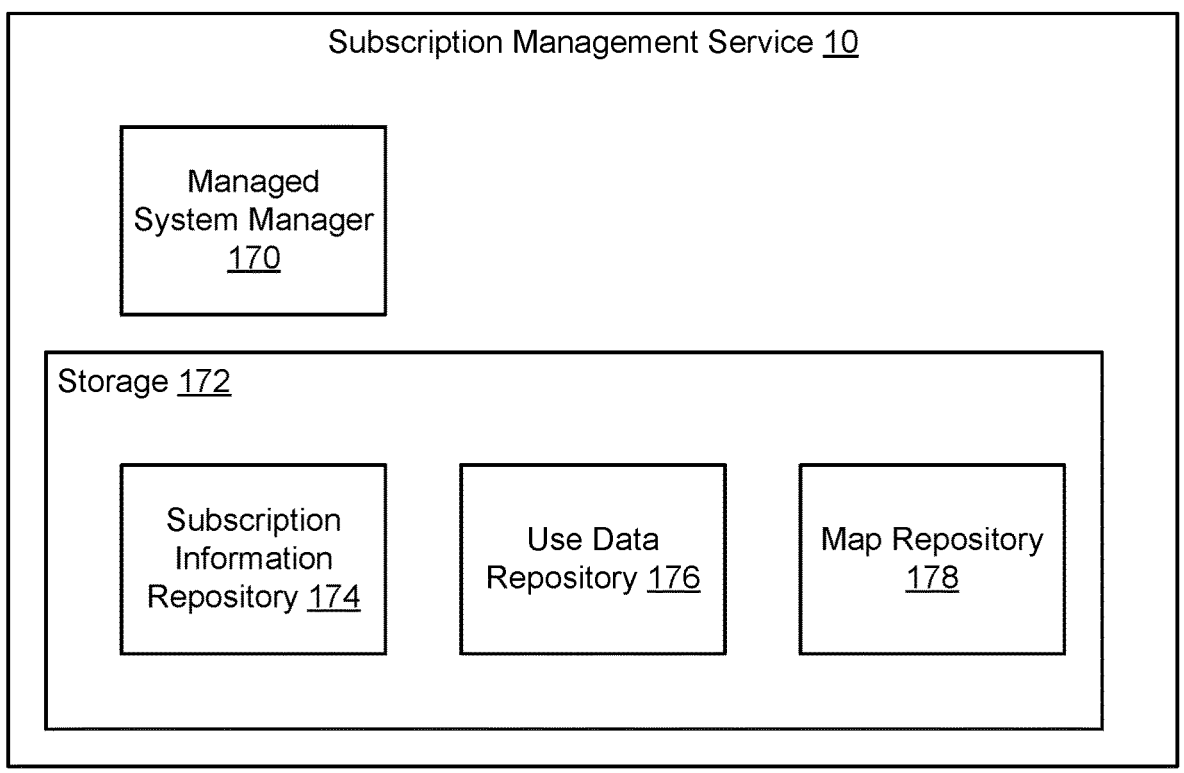
FIG. 1D shows a block diagram illustrating a subscription management service in accordance with an embodiment.

Turning to FIG. 1D, a block diagram of subscription management service 10 in accordance with an embodiment is shown. As discussed above, subscription management service 10 may manage the operation of managed systems based on subscriptions. To provide its functionality, subscription management service may include managed system manager 170 and storage 172. Each of these components is discussed below.

Managed system manager 170 may include functionality to (i) obtain subscription information for various users of managed systems (e.g., an use the subscription information to managed various managed systems), (ii) provide information regarding use of the managed systems by the user to the users, (iii) provide the users of the managed systems regarding their use of the managed systems, and/or (iv) automatically and/or at the direction of user of managed systems, modify subscriptions for the users to improve the likelihood that the managed systems provide computer implemented services desired by user of the managed systems. To service the modified subscriptions, managed systems manager 170 may (i) initiate deployment of managed systems and/or communication devices (e.g., to a new or existing deployment) and (ii) initiate global maximum transmission unit determination processes using some, or all, of the newly deployed and/or previously deployed managed systems and/or communication devices. To select managed systems and/or communication devices, managed systems manager 170 may utilize information included in subscription information repository 174 and/or map repository 178.

In an embodiment, the global MTU is determined by the edge communication devices that operably connected discrete level two networks to other level two networks that serve the managed devices. The edge communication devices may serve as tunnel endpoints for virtual networks to facilitate level two network data unit propagation between discrete level two networks. The edge communication devices may identify the maximum transmission units of any of the transport networks that transmit the encapsulated level two network data units across the tunnel endpoints and the data overhead for the encapsulation. Each of the edge communication devices may advertise (e.g., via LLDP, PMSI, etc.) this information thereby allowing each of the devices in the networks to identify the largest MTU that may still be encapsulated and transmitted over all of the transport networks without risking fragmentation over the transport networks (or rejection via traffic dropping if fragmentation is not allowed). The global MTU may be selected accordingly (e.g., and/or reduced in size further to add a factor of safety, but may be substantially the same size)

Figure 4A:
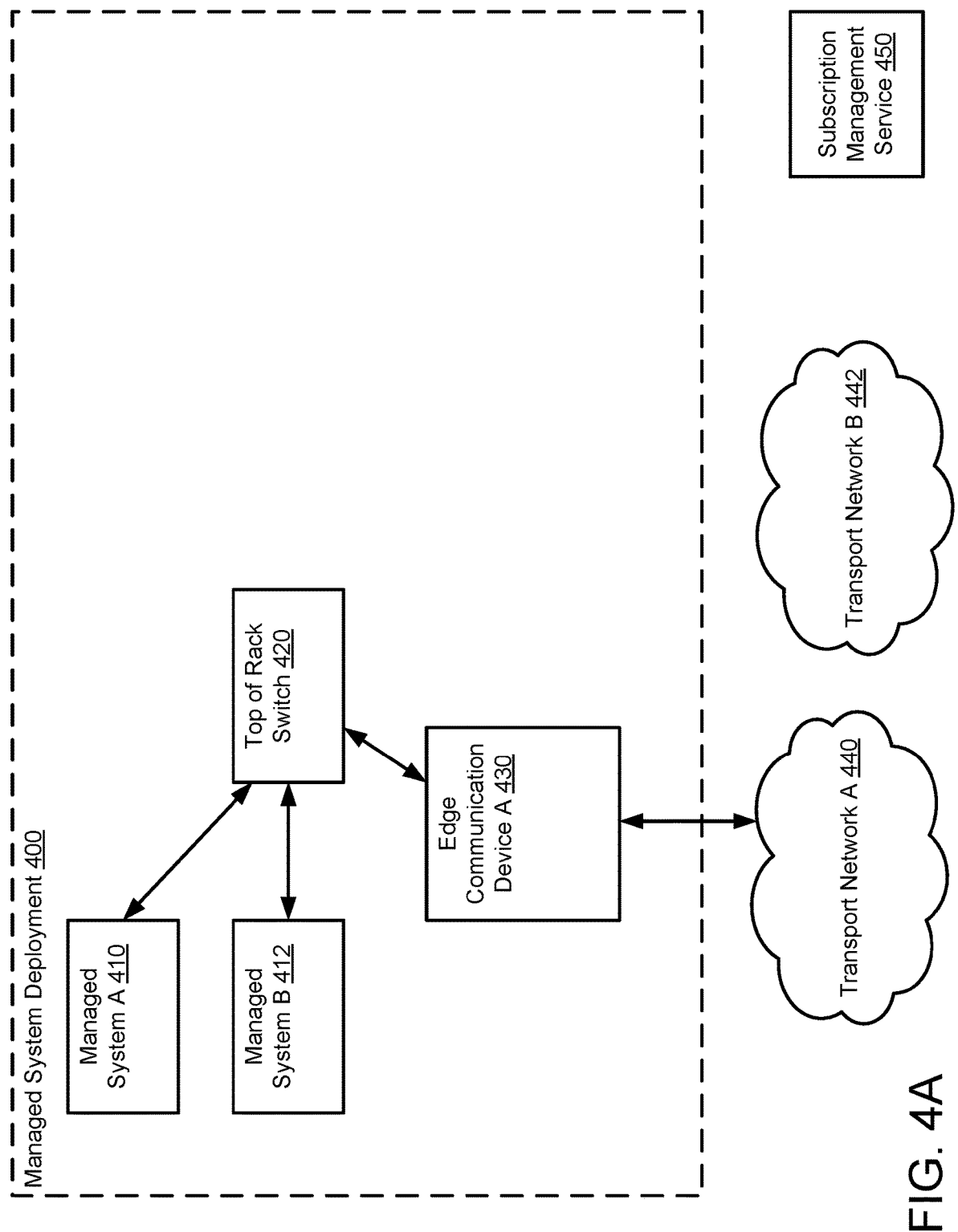
FIGS. 4A-4F show diagrams illustrating interactions between and actions of components of a system in accordance with an embodiment.
Figure 4B:
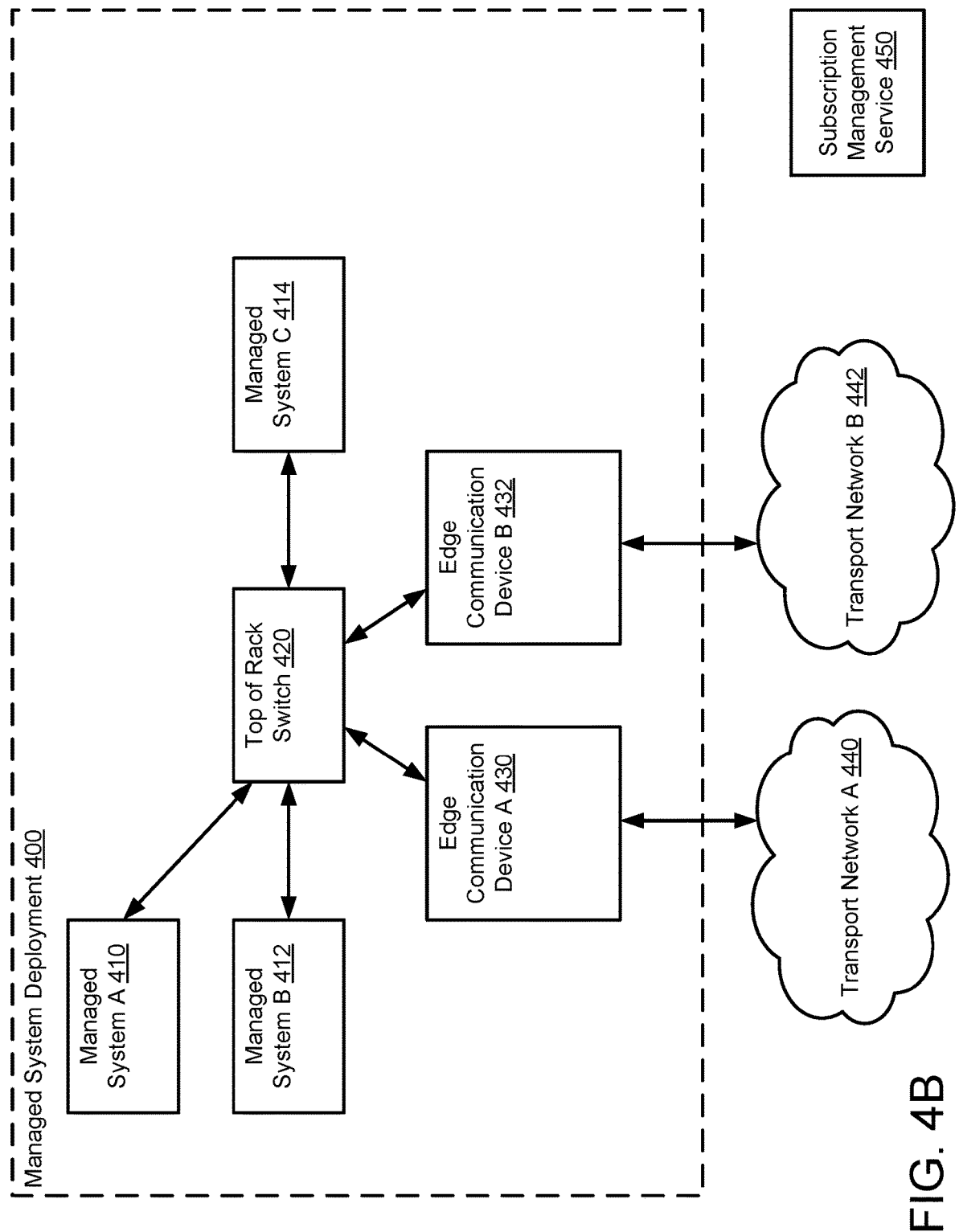

When providing its functionality, managed system manager 170 may perform all, or a portion of the methods of FIGS. 2-3 and/or the actions illustrated in and/or described with respect to FIGS. 4A-4B.

In an embodiment, managed system manager 170 is implemented using a hardware device including circuitry. The hardware device may be, for example, a digital signal processor, a field programmable gate array, or an application specific integrated circuit. The circuitry may be adapted to cause the hardware device to perform the functionality of managed system manager 170. Managed system manager 170 may be implemented using other types of hardware devices without departing embodiment disclosed herein.

In one embodiment, managed system manager 170 is implemented using a processor adapted to execute computing code stored on a persistent storage that when executed by the processor performs the functionality of managed system manager 170 discussed throughout this application. The processor may be a hardware processor including circuitry such as, for example, a central processing unit, a processing core, or a microcontroller. The processor may be other types of hardware devices for processing information without departing embodiment disclosed herein.

In an embodiment, storage 172 is implemented using physical devices that provide data storage services (e.g., storing data and providing copies of previously stored data). The devices that provide data storage services may include hardware devices and/or logical devices. For example, storage 172 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 172 may include a memory device (e.g., a dual in line memory device) in which data is stored and from which copies of previously stored data are provided. In another example, storage 172 may include a persistent storage device (e.g., a solid-state disk drive) in which data is stored and from which copies of previously stored data is provided. In a still further example, storage 172 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 172 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 172 may store data structures including subscription information repository 174, use data repository 176, and map repository 178.

Subscription information repository 174 may be implemented with one or more data structures that store information regarding subscriptions agreed to by various users. For example, subscription information repository 174 may indicate (i) agreed to subscriptions, (ii) agreed to changes in subscriptions upon the occurrence of corresponding conditions (e.g., subscription limits being reached), and/or other information regarding subscriptions for user of managed systems.

Use data repository 176 may be implemented with one or more data structures that store information regarding use of the services provided by one or more managed systems to users (e.g., that have agreed to various subscriptions for such use). The use data may include quantities of services utilized by a user (e.g., absolute quantities, use rates, and/or other types of information regarding use of such services by subscribed entities), quantities of computing resources consumed by services provided to a user, and/or other information usable to quantify use of managed systems or services provided by the managed systems.

Map repository 178 may be implemented with one or more data structures that store information regarding existing deployments of managed systems and communication devices. Map repository 178 may be used in combination with subscription information repository 174 to (i) identify needed capabilities of deployments to provide services, (ii) identify existing capabilities of deployments, and (iii) select additional managed systems and/or communication devices for deployment to existing deployments or new deployments so that the subscription obligations may be met. The selection may be based, for example, on heuristically obtained information such that subscriptions may be used to estimate corresponding necessary capabilities.

While various data structures have been illustrated and described in FIG. 1D, any of the data structures may be implemented with any type of structure (e.g., lists, tables, linked lists, databases, etc.), stored in different locations, and/or spanned across any number of devices without departing from embodiments disclosed herein. For example, any of the data structures shown in FIG. 1D may be stored remotely to subscription management service 10 (e.g., in a cloud resource, etc.) in a manner that is still accessible to subscription management service 10.

While illustrated in FIG. 1D with a limited number of specific components, a local subscription manager may include additional, fewer, and/or different components without departing from embodiments disclosed herein.

As discussed above, multiple managed systems and communication devices may be aggregated to form one or more deployments. Any number of deployments may cooperate to provide computer implemented services.

Figure 1E:
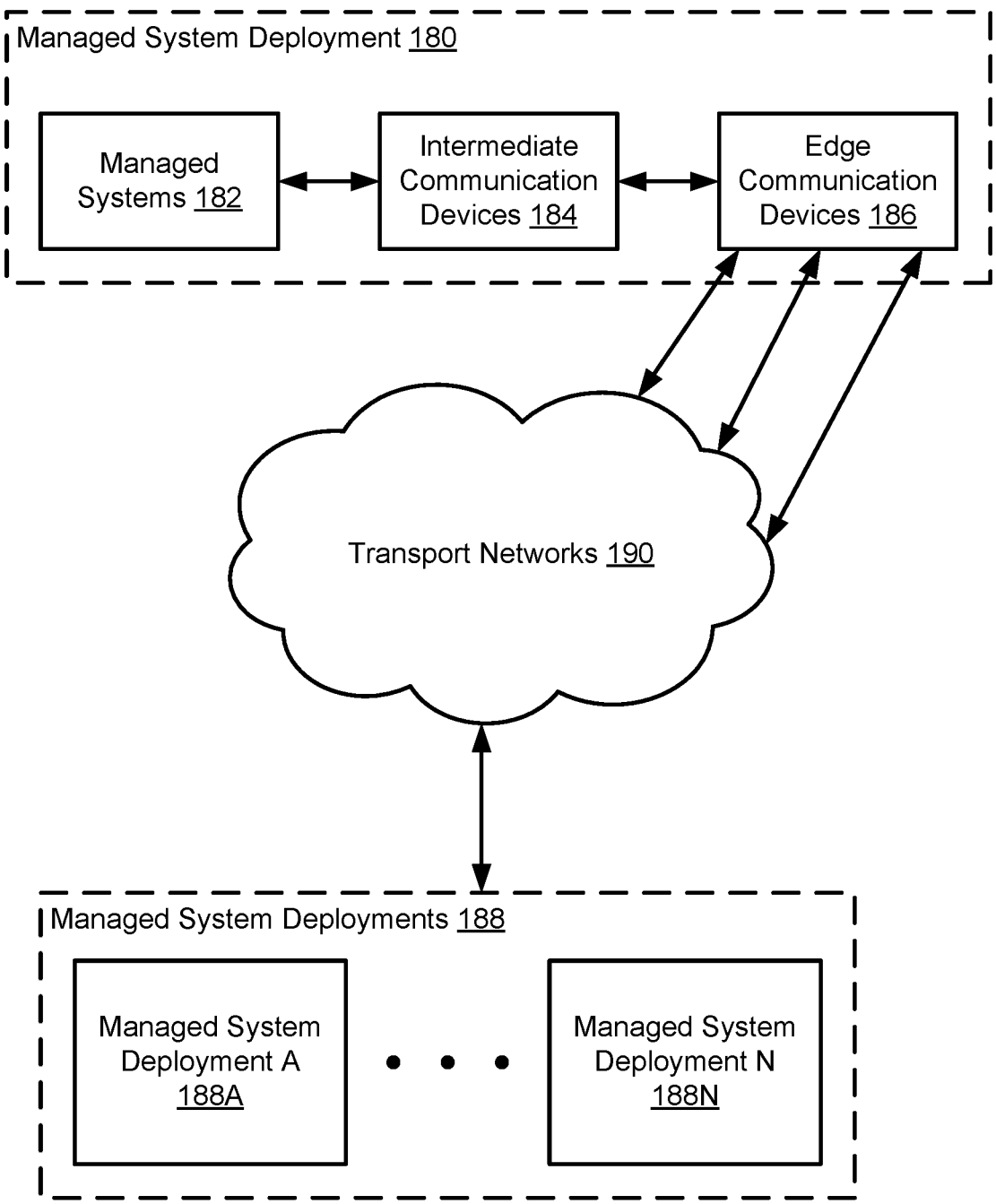
FIG. 1E shows a block diagram illustrating a managed system aggregation in accordance with an embodiment.

Turning to FIG. 1E, a diagram of an example aggregation of managed system deployments 180, 188 in accordance with an embodiment is shown. Subscription management service 10 may select and deploy any number of managed systems 182 and communication devices 184, 186 to form managed system deployments 180, 188. Any of managed system deployments 180, 188 may implement a layer two communication network locally for the members of the respective deployments.

For example, the managed system deployments may include any number of intermediate communication devices (e.g., 184) that facilitate Ethernet communications or other layer two communications in the OSI networking model. In other words, the intermediate communication devices may facilitate local connections using media access control addresses. Any of the intermediate communication devices 184 may be implemented with switches (e.g., top of rack switches) or other types of communication devices.

To facilitate connectivity between managed system deployments, any number of edge communication devices (e.g., 186) may be deployed. The edge communication devices may include functionality to serve as tunnel endpoints (edge devices of virtual extensible local area networks). The tunnel endpoints may encapsulate layer two network data units in a manner that allows for the encapsulated network data units to be transported over transport networks 190 to other managed system deployments (e.g., 188A, 188N). Pairs of edge communication devices from different managed system deployments 188 may serve as tunnels. The network data unit traffic may be managed, for example, using virtual local area networks or other type of overlay networks.

When an encapsulated network data unit is received, the encapsulation data (e.g., a header and/or footer) may be removed leaving the original network data unit. The network data unit may then be transmitted via layer two protocols to a corresponding intermediate communication device and/or managed system depending on the destination for the network data unit.

To transmit the network data unit between the various components illustrated in FIG. 1E, each of the devices (including transport networks 190 and components thereof) may include a network data unit processor (e.g., a network interface card). The network data unit processors may be configured to only transmit certain quantities (e.g., corresponding to a MTU) of data at a time.

The components of the managed system deployments (e.g., 180, 188) may be configurable thereby allowing for the quantity of data transmitted by their respective network data unit processors to be modified. However, the transport networks 190 may not be configurable by subscription management service 10.

To manage the efficiency of communications, the edge communication devices 186 may be adapted to cooperatively identify a global MTU. The global MTU may be identified by identifying the smallest MTU of the transport networks 190 and the quantity of data that is added to network data units when encapsulated by the edge communication devices. The global MTU may be selected so that all network data units generated by managed systems and encapsulated by edge communication devices have a total size that is substantially the same as (e.g., but at least smaller than) the identified smallest MTU. Consequently, when edge communication devices 186 encapsulate and transmit network data units via transport networks 190, the encapsulated network data units will not be subject to fragmentation (or rejection/dropping if transport networks 190 do not support fragmentation).

For example, if a smallest MTU of transport networks 190 is identified as 1.5 kilobytes and the amount of data added to network data units for encapsulation is 100 kilobytes, then the global MTU may be selected as 1.4 kilobytes.

Once identified, the global MTU may be advertised to or otherwise provided to intermediate communication device 184 and managed systems 182 (e.g., via advertisement). Consequently, the network data units generated by managed devices may, when encapsulated, not be fragmented or dropped by transport networks 190.

Edge communication devices (e.g., 186) may be implemented with any type of communication device such as a router or other type of device that supports layer two network data unit forwarding, virtual local area networks, and/or virtual extensible local area network or other functionality for encapsulating layer two network data units (e.g., Ethernet frames encapsulated to support higher layer routing such as internet protocol and/or user datagram protocol (UDP)). The edge communication devices and/or intermediate communication devices may be adapted to perform, for example, the border gateway protocol, internet protocol, layer two switching, and/or other network discovery and communication protocols.

While illustrated in FIG. 1E with a limited number of specific components, a managed device aggregation may include additional, fewer, and/or different components without departing from embodiments disclosed herein.

As discussed above, the components of FIG. 1A may perform various methods to provide computer implemented services using managed systems. FIGS. 2-3 illustrate examples of methods that may be performed by the components of FIG. 1A. For example, a subscription management service, communication devices, managed devices, etc. may perform all or a portion of the methods. In the diagrams discussed below and shown in FIGS. 2-3, any of the operations may be repeated, performed in different orders, and/or performed in parallel with or in a partially overlapping in time manner with other operations.

Turning to FIG. 2, a flow diagram illustrating a method of servicing a subscription update request in accordance with an embodiment is shown.

At operation 200, a subscription update request is obtained. The subscription update request may be obtained via a graphical user interface presented to a user. The user may provide user input to the graphical user interface. The user input may instantiate the subscription update request. The subscription update may specify a change to computer implemented services to which the user is subscribed.

At operation 202, one or more managed systems and one or more communication devices to service the subscription update request are deployed. The one or more managed systems and one or more communication devices may be deployed to a new or existing managed system aggregation.

The one or more managed systems and one or more communication devices may be selected based on the change in computer implemented services and any existing deployed managed systems and/or communication devices used to provide computer implemented services to the user. For example, the total necessary resources to service the subscription may be identified, compared to the existing resources, and any difference may be used as the basis for the selection (e.g., such that the resulting capacity meets the necessary resources to service the modified subscription).

In an embodiment, the one or more managed systems and one or more communication devices are deployed by selecting them, scheduling shipment to, and installation at a managed system deployment. The managed system deployment may be, for example, at or near a user selected site such as a data center or an on-premises facility.

At operation 204, cooperative communication limits analysis for the one or more managed systems and the one or more communication devices is initiated to identify a global maximum transmission unit. The cooperative communication limits analysis may be initiated after the one or more managed systems and one or more communication devices are deployed. The cooperative communication limits analysis may be initiated, for example, by sending instructions via one or more messages. In response to the received messages, the cooperative communication limits analysis may be automatically performed.

In an embodiment, the cooperative communication limits analysis is performed via the method illustrated in FIG. 3. The cooperative communication limits analysis may be performed via other methods without departing from embodiments disclosed herein.

At operation 206, the one or more managed systems and one or more communication devices are configured to communicate based on the global maximum transmission unit. The one or more managed systems and one or more communication devices may be configured by modifying the operation of respective network data unit processors of these devices. The network data unit processors may be modified so that generated and sent network data units are substantially the same size as the global maximum transmission unit. For example, the resulting network data units may be just smaller in size than the global maximum transmission unit. The network data units may include, for example, a payload of data to be transmitted to another device and control information. The network data units (e.g., also referred to as "compliant network data units") may include, for example, Ethernet frames to be transmitted via Ethernet links.

The compliant network data units may be of a size that, when encapsulated by edge network devices, result in encapsulated network data units that facilitate efficient communication via transport networks. For example, the encapsulated network data units may be substantially the same size as the MTU of various communication devices of the transport networks used to forward the encapsulated network data units between layer two networks. Consequently, fragmentation and/or dropping of the encapsulated network data units may be avoided.

While described with respect to MTU limits imposed by transport networks, the global MTU may be identified, in operation 204, based on MTU limitations of other devices of managed system deployments without departing from embodiments disclosed herein.

To configure the one or more managed systems and one or more communication devices, information regarding the global MTU, MUTs of other devices, overhead for various encapsulation performed in the managed system deployments, and/or other information may be advertised to devices of the managed system deployments. The information may be advertised via any communication protocol compliant scheme such as via LLDP communications and/or route advertisements (e.g., such as type three route advertisements). Any of the devices of the managed system deployments may identify the global MTU via such advertisements (e.g., by receiving it directly or calculating it via received information).

At operation 208, subscribed to computer implemented services are provided to a requesting entity using, in part, communications based on the global MTU between the one or more managed systems. For example, the managed systems may, as part of providing the computer implemented services, need to send data to other devices. To do so, the managed systems may generate network data units limited in size based on the global MTU. Consequently, the network data units may facilitate efficient communications by being closely matched in size to the MTU thereby reducing fragmentation and/or drops of the network data units.

The method may end following operation 208.

Turning to FIG. 3, a flow diagram illustrating a method of obtaining a global MTU in accordance with an embodiment is shown.

At operation 300, a largest supported maximum transmission unit for a portion of devices is calculated. The portion of the devices may include managed devices and/or communication devices of one or more managed system deployments. Each of the devices may calculate a largest supported MTU. The largest supported MTU may be calculated based on (i) any limitations of network data unit processors of the devices and (ii) any limitations on MTU transmission via operably connections to other devices via the respective devices.

For example, devices operably connected to transport networks or other configurable (e.g., by a subscription management service) networks may drop network data units exceeding a certain size. This certain size may be treated by the devices as a limit on their own MTU.

To calculate a respective largest supported MTU, each device may subtract, from the MTUs, the quantity of data used for encapsulation purposes. For example, an edge device may add a header and/or footer when forwarding a network data unit over a transport network that already has a limited MTU. In such a scenario, the largest supported MTU may be calculated by subtracting the quantity of data for encapsulation from the MTU of the transport network. The resulting largest supported MTU may be of a size that network data units of the same size may be encapsulated and sent of the transport network without being fragmented or dropped while also minimizing unused space in transmission.

At operation 302, the calculated largest supported MTUs are advertised. The largest supported MTUs may be advertised by providing other devices of the managed system deployments with information regarding the respective largest supported MTUs. The advertising may be performed via LLDP communications, PMSI advertisements of routes, and/or via other communication or management protocol communications.

AT operation 304, one of the advertised calculated largest supported MTUs is selected as the global maximum transmission unit. The smallest advertised calculated largest supported MTUs may be selected as the global maximum transmission unit. Each of the devices may receive the advertisements from the other devices, perform a comparison, and each select the same advertised calculated largest supported MTUs is selected as the global maximum transmission unit.

The method may end following operation 304.

Using the methods illustrated in FIGS. 2-3, embodiments disclosed herein may provide a system that more efficiently utilizes communication resources. To do so, the system may automatically globally configure MTUs to prevent (and/or reduce) fragmentation, dropping, and unused space in communications. Additionally, the disclosed method may improve the rate of convergence of communication systems. By tying performance of cooperative methods of determining global MTUs to specific occurrences, embodiments disclosed herein may reduce network data unit dropped and/or other undesired operations during network convergence through passive learning.

To further clarify embodiments disclosed herein, example operation of a system in accordance with embodiments disclosed herein are illustrated in FIGS. 4A-4F. Turning to FIGS. 4A-4F, diagrams of the operation of a system in accordance with an embodiment are shown. Like named components in FIGS. 4A-B and FIG. 1A may be similar.

In these figures, example actions and interactions between components of a system are shown. Operations performed by the components are emphasized with number, circular blocks and interactions between the components (e.g., data transmission, instructions, etc.) are illustrated using arrows having dashed tails.

Now, turning to FIG. 4A, consider an example scenario where managed system deployment 400 provides desired computer implemented services to a user. To provide the desired computer implemented services, managed system deployment 400 includes two managed systems 410, 412, an intermediate communication devices implemented with top of rack switch 420, and edge communication device A 430 to facilitate communications with other managed systems via transport network A 440. Subscription management service 450 is tasked with managing managed system deployment 400. Currently, these managed systems and communication devices have implemented a MTU of 1.5 kilobytes based on an overhead encapsulation of 0.2 kilobytes and a MTU supported by transport network A 440 of 1.7 kilobytes.

At a first point in time, the user of the computer implemented services modifies the subscription for the services. Based on the modified subscription, subscription management service 450 determines that another managed system and another edge communication device will be needed to meet the obligations under the modified subscription. Based on the determination, subscription management service 450 deploys the aforementioned components to managed system deployment 400.

Turning to FIG. 4B, the deployment adds managed system C 414 and edge communication device B 432 to managed system deployment 400. However, in doing so, the resulting topology may result in transport of some network data units via edge communication device B 432 and transport network B 442. Accordingly, subscription management service 450 initiates the collaborative global MTU selection procedure.

Figure 4C:
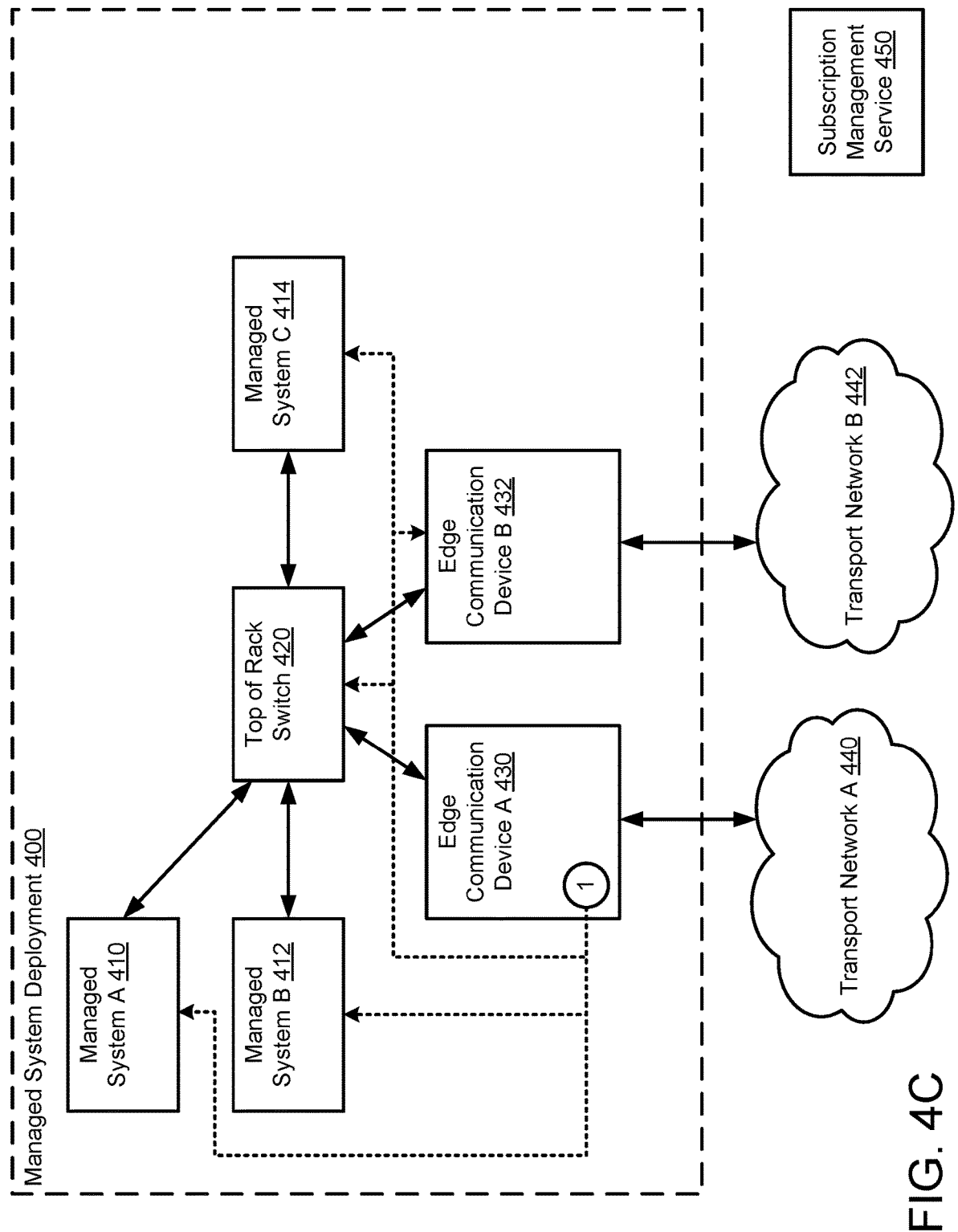
Figure 4D:
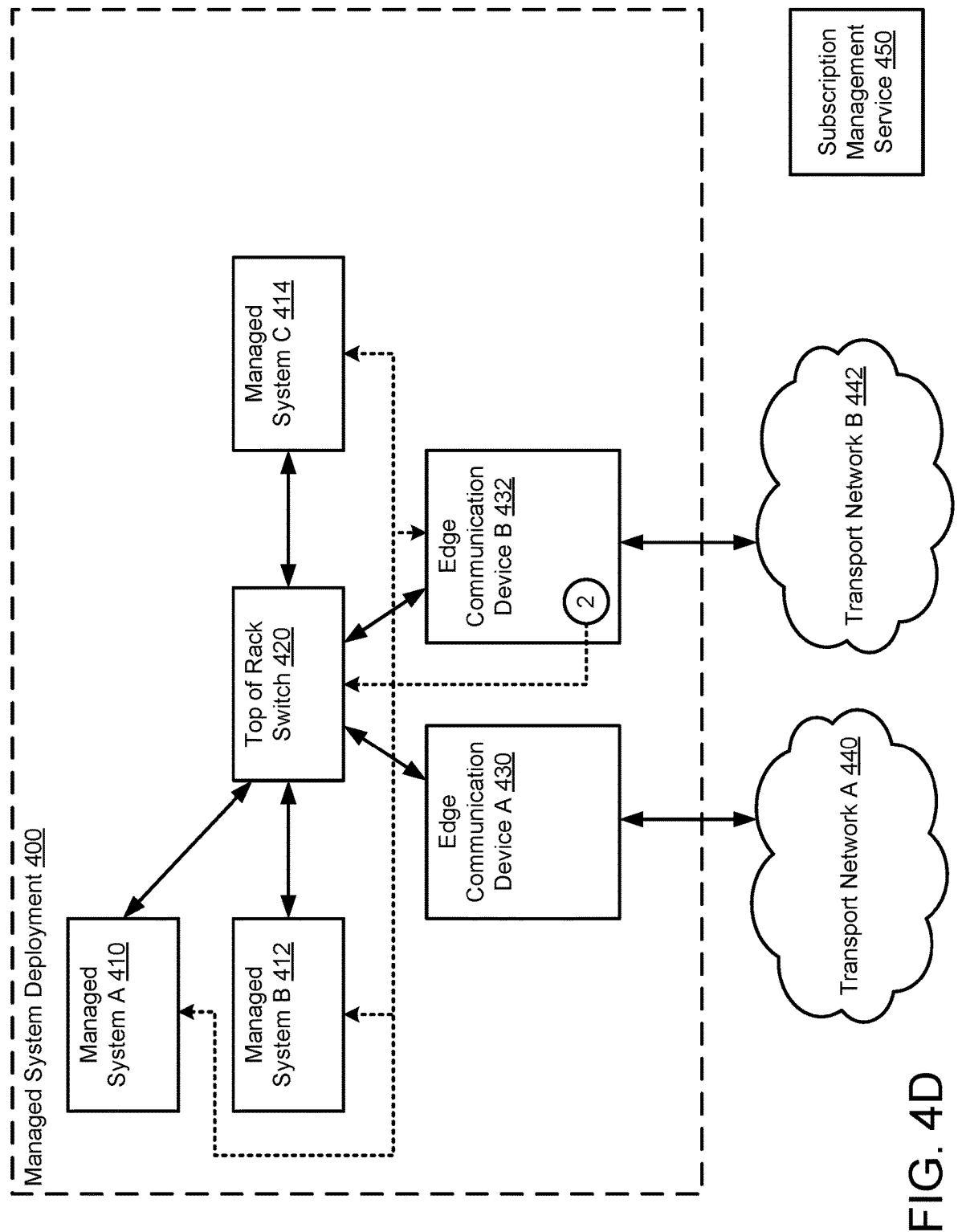

Turning to FIG. 4C, at block 1, edge communication device A 430 calculates its largest supported MTU, which is still 1.5 kilobytes. Edge communication device A 430 then advertises the calculation to the other devices of managed system deployment 400. In FIG. 4C, this process is shown in a simplified manner. For example, edge communication device A 430 may only be able to advertise to its neighbor top of rack switch 420 which may, in turn, advertise the largest supported MTU to managed systems 410, 412, 414 and edge communication device B 432.

Turning to FIG. 4C, at block 2, edge communication device B 432 calculates its largest supported MTU. To do so, edge communication device B 432 may identify the MTU of the path via transport network B 442 which, in this example, is 1.5 kilobytes. Edge communication device B 432 may also calculate its encapsulation overhead which, in this example, is 0.1 kilobytes. Consequently, edge communication device B 432 calculates its largest supported MTU to be 1.4 kilobytes.

Edge communication device B 432 then advertises the calculation to the other devices of managed system deployment 400. Consequently, after block 2, all of the devices of managed system deployment 400 may be aware of both of the largest supported MTUs.

Figure 4E:
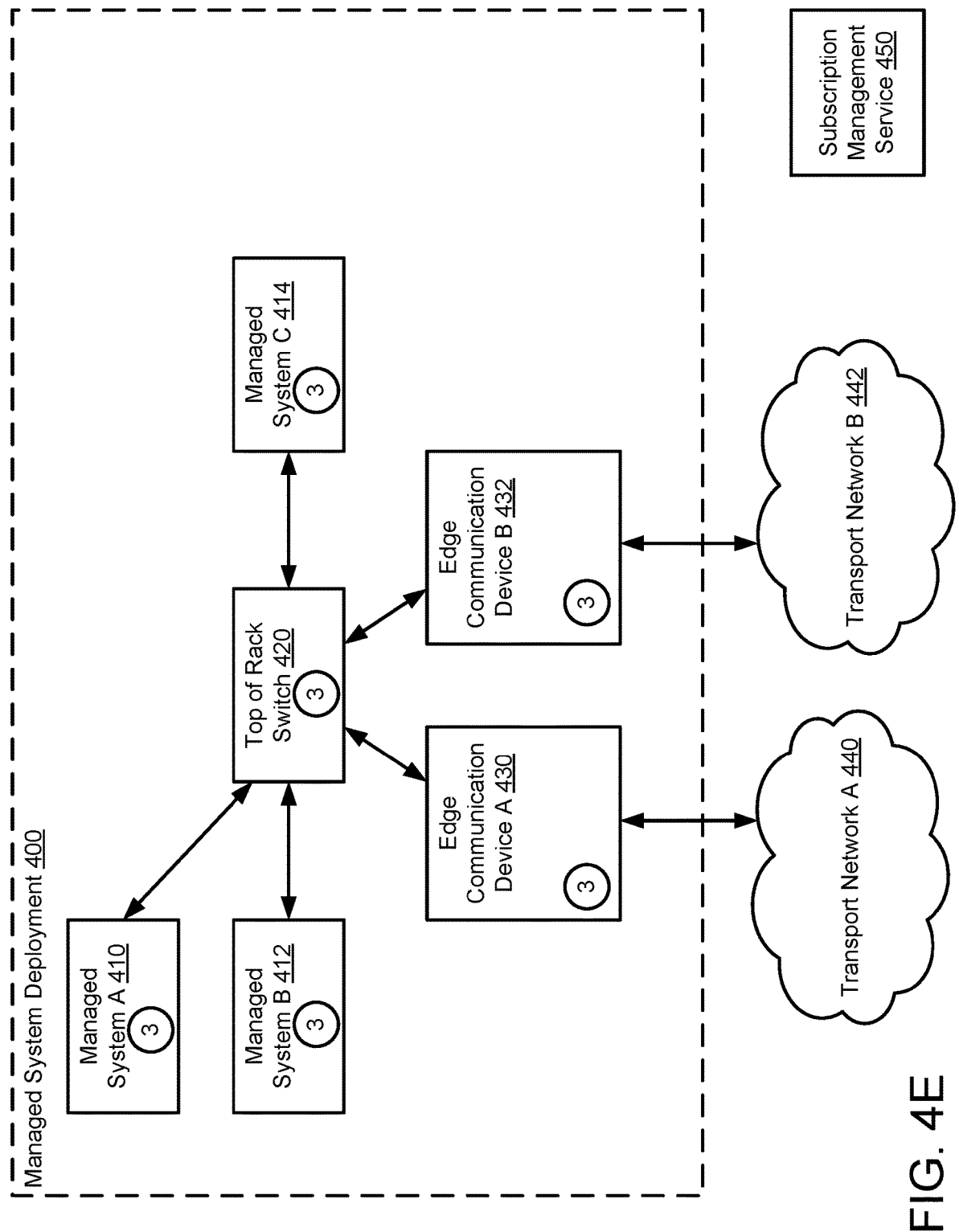

Turning to FIG. 4E, all of the devices (that may transmit network traffic via the transport networks) of managed systems deployment 400, at block 3, then perform a comparison between these largest supported MTUs and identify that the global MTU is 1.4 kilobytes. Consequently, each of managed systems 410, 412, 414 to only generate and transmit network data units that are within the 1.4 kilobyte limit.

Figure 4F:
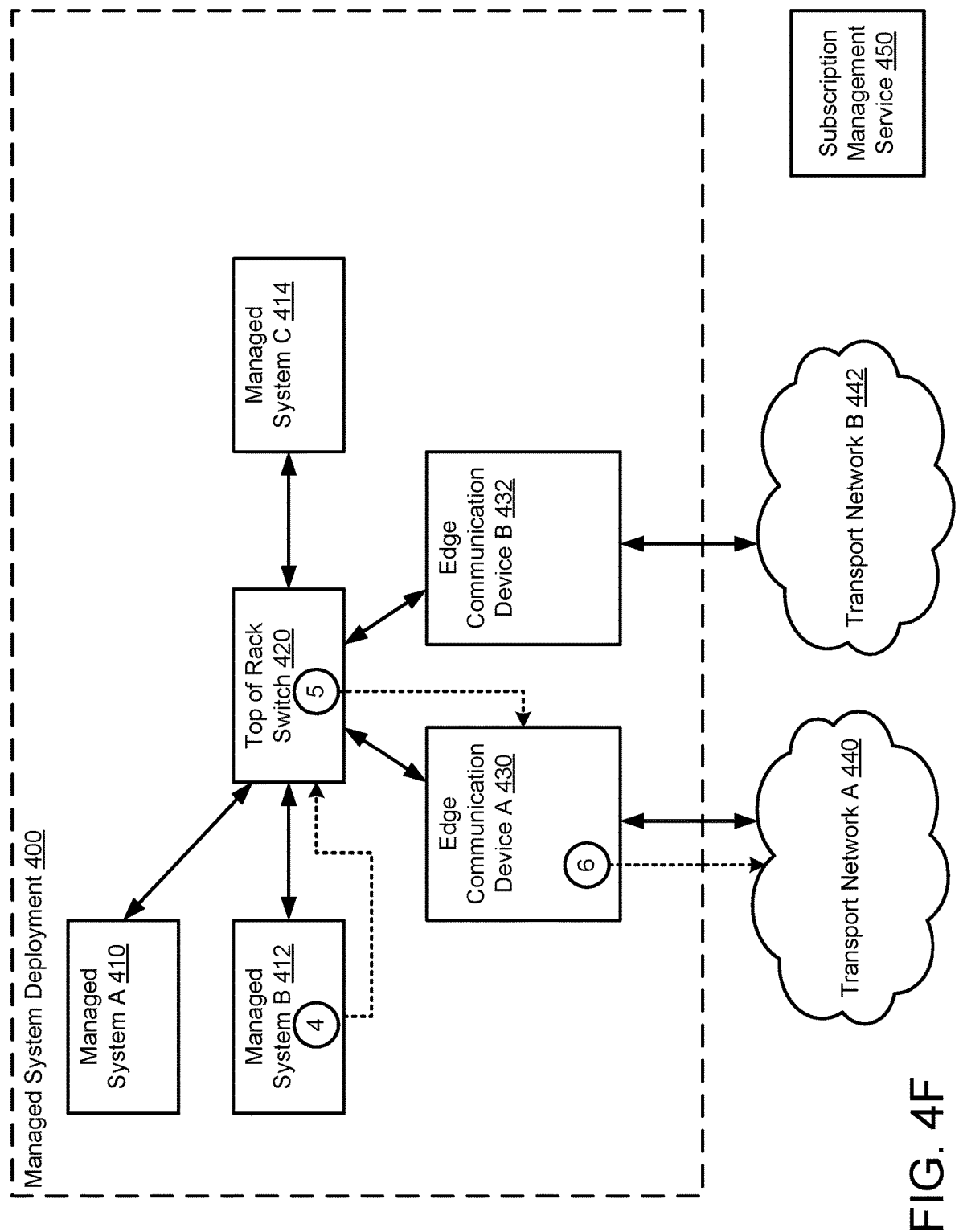

Turning to FIG. 4F, once configured, managed systems 410, 412, 414 begin to provide the computer implemented services to the user. To do so, managed system B 412, at block 4, generates and sends a network data unit destined for a device reachable via transport network A 440. The generated network data unit is 1.4 kilobytes in size. Managed system B 412 transmits the generated network data unit to top of rack switch 420.

At block 5, top of rack switch 420 forwards the network data unit to edge communication device A 430. Once received, edge communication device A 430, at block 6, encapsulates the generated network data unit increasing its size to 1.6 kilobytes. edge communication device A 430 then forwards the encapsulated generated network data unit via transport network A 440. Because the size of the encapsulated generated network data unit is 1.6 kilobytes, it is forwarded via transport network A 440 without being fragmented.

Thus, as seen in FIGS. 4A-4B, the distributed systems may, upon modification to meet subscription obligations, may automatically reconfigure itself to improve the efficiency of network communications. Consequently, the distributed system may be better able to provide the desired computer implemented services.

By providing methods and systems, as discussed above, an improved computing system may be provided that may be more resilient to attempts to contravene or otherwise interfere with the computer implemented services provided by a distributed system as part of a solution. Any of the managed systems may be subject to compromise due to malware and/or other types of entities. In distributed systems, malware may be particularly problematic because it may prevent management of systems if the control layer on the managed systems is compromised. Embodiments disclosed herein may provide a distributed control layer that does not include the managed systems themselves. Rather, embodiments disclosed herein may utilize local subscription managers for providing control plane functionality for managed systems. Unlike the managed systems that may be highly reconfigurable to provide various solutions (which may make them more susceptible to compromise by virtue of their configurability), the local subscription managers may be implemented as hardened or locked down entities.

Further, the local subscription managers may present network end points and/or otherwise publicly identify as devices separate from host managed systems. Consequently, the control layer used to manage the configuration of the distributed system may be far more resilient to malicious attacks.

Accordingly, embodiments disclosed herein may be provide for the improved operation of distributed system by improving reliance to malware or other types of third party attacks while still providing for configurability over time such that various types of desired solutions may be provided over time.

Further, by automatically and responsively reconfiguring the operation of network data unit processors based on changes in subscriptions, the disclosed distributed system may improve the efficiency of network communications by, for example, reducing network data unit fragmentation, reducing network data unit dropping, increasing network convergence rates (e.g., to a final operating state by avoiding time consuming methods of learning the network environment), and/or otherwise improving the efficiency of transmissions across a distributed system.

As discussed above, various components may be implemented with computing devices. For example, any of the components illustrated in FIGS. 1-4F may be implemented with one or more computing devices. Turning to FIG. 5, a block diagram illustrating an example of a data processing system (e.g., a computing device) in accordance with an embodiment is shown. For example, system 500 may represent any of data processing systems described above performing any of the processes or methods described above. System 500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 500 is intended to show a high level view of many components of the computer system. However, it is to be understood that additional components may be present in certain implementations and furthermore, different arrangement of the components shown may occur in other implementations. System 500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 500 includes processor 501, memory 503, and devices 505-508 via a bus or an interconnect 510. Processor 501 may represent a single processor or multiple processors with a single processor core or multiple processor cores included therein. Processor 501 may represent one or more general-purpose processors such as a microprocessor, a central processing unit (CPU), or the like. More particularly, processor 501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 501, which may be a low power multi-core processor socket such as an ultra-low voltage processor, may act as a main processing unit and central hub for communication with the various components of the system. Such processor can be implemented as a system on chip (SoC). Processor 501 is configured to execute instructions for performing the operations discussed herein. System 500 may further include a graphics interface that communicates with optional graphics subsystem 504, which may include a display controller, a graphics processor, and/or a display device.

Processor 501 may communicate with memory 503, which in one embodiment can be implemented via multiple memory devices to provide for a given amount of system memory. Memory 503 may include one or more volatile storage (or memory) devices such as random access memory (RAM), dynamic RAM (DRAM), synchronous DRAM (SDRAM), static RAM (SRAM), or other types of storage devices. Memory 503 may store information including sequences of instructions that are executed by processor 501, or any other device. For example, executable code and/or data of a variety of operating systems, device drivers, firmware (e.g., input output basic system or BIOS), and/or applications can be loaded in memory 503 and executed by processor 501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 500 may further include IO devices such as devices (e.g., 505, 506, 507, 508) including network interface device(s) 505, optional input device(s) 506, and other optional IO device(s) 507. Network interface device(s) 505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 506 may include a mouse, a touch pad, a touch sensitive screen (which may be integrated with a display device of optional graphics subsystem 504), a pointer device such as a stylus, and/or a keyboard (e.g., physical keyboard or a virtual keyboard displayed as part of a touch sensitive screen). For example, input device(s) 506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

TO devices 507 may include an audio device. An audio device may include a speaker and/or a microphone to facilitate voice-enabled functions, such as voice recognition, voice replication, digital recording, and/or telephony functions. Other IO devices 507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 510 via a sensor hub (not shown), while other devices such as a keyboard or thermal sensor may be controlled by an embedded controller (not shown), dependent upon the specific configuration or design of system 500.

To provide for persistent storage of information such as data, applications, one or more operating systems and so forth, a mass storage (not shown) may also couple to processor 501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 501, e.g., via a serial peripheral interface (SPI). This flash device may provide for non-volatile storage of system software, including a basic input/output software (BIOS) as well as other firmware of the system.

Storage device 508 may include computer-readable storage medium 509 (also known as a machine-readable storage medium or a computer-readable medium) on which is stored one or more sets of instructions or software (e.g., processing module, unit, and/or processing module/unit/logic 528) embodying any one or more of the methodologies or functions described herein. Processing module/unit/logic 528 may represent any of the components described above. Processing module/unit/logic 528 may also reside, completely or at least partially, within memory 503 and/or within processor 501 during execution thereof by system 500, memory 503 and processor 501 also constituting machine-accessible storage media. Processing module/unit/logic 528 may further be transmitted or received over a network via network interface device(s) 505.

Computer-readable storage medium 509 may also be used to store some software functionalities described above persistently. While computer-readable storage medium 509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies disclosed herein. The term "computer-readable storage medium" shall accordingly be taken to include, but not be limited to, solid-state memories, and optical and magnetic media, or any other non-transitory machine-readable medium.

Processing module/unit/logic 528, components and other features described herein can be implemented as discrete hardware components or integrated in the functionality of hardware components such as ASICS, FPGAs, DSPs or similar devices. In addition, processing module/unit/logic 528 can be implemented as firmware or functional circuitry within hardware devices. Further, processing module/unit/logic 528 can be implemented in any combination hardware devices and software components.

Note that while system 500 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein as described herein.

In the foregoing specification, embodiments have been described with reference to specific exemplary embodiments thereof. It will be evident that various modifications may be made thereto without departing from the broader spirit and scope disclosed herein as set forth in the following claims. The specification and drawings are, accordingly, to be regarded in an illustrative sense rather than a restrictive sense.

What is claimed is:

1. A computer-implemented method for managing a distributed system managed via subscriptions, the method comprising:
obtaining, by a subscription manager of the distributed system, a subscription update request from a subscribed entity that receives computer implemented services from the distributed system, the subscription update request indicating deployment of additional resources for the distributed system;
physically deploying, by the subscription manager and based on the subscription update request, one or more managed systems and one or more communication devices as the additional resources for the distributed system;
prior to providing the computer implemented services using the physically deployed ones of the one or more managed systems and one or more communication devices:
initiating, by the subscription manager, cooperative communication limits analysis for the one or more managed systems and the one or more communication devices to identify a global maximum transmission unit, wherein the global maximum transmission unit specifies a maximum size for all network data units to be generated by one or more network data unit processors of the one or more managed systems, and
configuring the one or more network data unit processors of the one or more managed systems to only generate the network data units such that each of the generated ones of the network data units is equal to or smaller than the global maximum transmission unit; and
providing the computer implemented services to the subscribed entity using, in part, communications generated by the configured one or more managed systems and the one or more communication devices to comply with the subscription update request.

2. The computer-implemented method of claim 1, wherein the cooperative communication limits analysis comprises:
initiating, by a portion of the one or more managed systems and the one or more communication devices, calculation of a largest supported maximum transmission unit based, at least in part, on overhead of a communication scheme used to transmit the communications;
advertising, by the portion, the largest supported maximum transmission unit calculated by each device of the portion; and
selecting, by the portion, one of the respective largest supported maximum transmission units that is supported by all devices of the portion as the global maximum transmission unit.

3. The computer-implemented method of claim 2, wherein the portion comprises virtual tunnel endpoint devices, the virtual tunnel endpoint devices providing connectivity between layer two networks that service corresponding portions of the one or more managed systems, and the virtual tunnel endpoint devices comprising at least one of the one or more communication devices.

4. The computer-implemented method of claim 3, wherein the overhead is a quantity of data used to encapsulate layer two network data units transmitted between the virtual tunnel endpoint devices.

5. The computer-implemented method of claim 4, wherein the respective largest supported maximum transmission units are based on the overhead and a maximum transmission unit size supported by the network, wherein the maximum transmission unit size supported by the network is the network data unit transmission size limit, and wherein the network interconnects at least two of the virtual tunnel endpoint devices.

6. The computer-implemented method of claim 5, wherein configuring the one or more managed systems and the one or more communication devices to communicate based on the global maximum transmission unit comprises:
limiting the network data unit processors of the portion to only generate the network data units such that each of the generated ones of the network data units is equal to or smaller than the global maximum transmission unit.

7. The computer-implemented method of claim 3, wherein the global maximum transmission unit allows the virtual tunnel endpoint devices to encapsulate network data units of a size of the global maximum transmission unit or smaller, and transmit the encapsulated network data units from the one or more managed systems without fragmentation and/or rejection by a transport network interconnecting the virtual tunnel endpoint devices.

8. The computer-implemented method of claim 1, wherein physically deploying, by the subscription manager and based on the subscription update request, one or more managed systems and one or more communication devices as the additional resources comprises:
selecting the one or more managed systems and the one or more communication devices;
scheduling shipment of the selected one or more managed systems and the one or more communication devices; and
initiating installation of the one or more managed systems and the one or more communication devices after shipment to a user selected site.

9. The computer-implemented method of claim 1, wherein providing the computer implemented services to the subscribed entity using, in part, the communications generated by the configured one or more managed systems and the one or more communication devices to comply with the subscription update request comprises:
generating and transmitting network data units of uniform size corresponding to the global maximum transmission unit, the network data units comprises data used to facilitate the computer implemented services.

10. The computer-implemented method of claim 1, wherein the maximum size specified by the global maximum transmission unit is smaller than a network data unit transmission size limit of a network interconnecting components making up the distributed system including the physically deployed ones of the one or more managed systems and one or more communication devices that are added as the additional resources.

11. A non-transitory machine-readable medium having instructions stored therein, which when executed by a processor, cause the processor to perform operations for managing a managing a distributed system managed via subscriptions, the operations comprising:
   obtaining, by a subscription manager of the distributed system, a subscription update request from a subscribed entity that receives computer implemented services from the distributed system, the subscription update request indicating deployment of additional resources for the distributed system;
   physically deploying, by the subscription manager and based on the subscription update request, one or more managed systems and one or more communication devices as the additional resources;
   prior to providing the computer implemented services using the physically deployed ones of the one or more managed systems and one or more communication devices:
      initiating, by the subscription manager, cooperative communication limits analysis for the one or more managed systems and the one or more communication devices to identify a global maximum transmission unit, wherein the global maximum transmission unit specifies a maximum size for all network data units to be generated by one or more network data unit processors of the one or more managed systems, and
      configuring the one or more network data unit processors of the one or more managed systems to only generate the network data units such that each of the generated ones of the network data units is equal to or smaller than the global maximum transmission unit; and
   providing the computer implemented services to the subscribed entity using, in part, communications generated by the configured one or more managed systems and the one or more communication devices to comply with the subscription update request.

12. The non-transitory machine-readable medium of claim 11, wherein the cooperative communication limits analysis comprises:
   initiating, by a portion of the one or more managed systems and the one or more communication devices, calculation of a largest supported maximum transmission unit based, at least in part, on overhead of a communication scheme used to transmit the communications;
   advertising, by the portion, the largest supported maximum transmission unit calculated by each device of the portion; and
   selecting, by the portion, one of the respective largest supported maximum transmission units that is supported by all devices of the portion as the global maximum transmission unit.

13. The non-transitory machine-readable medium of claim 12, wherein the portion comprises virtual tunnel endpoint devices, the virtual tunnel endpoint devices providing connectivity between layer two networks that service corresponding portions of the one or more managed systems, and the virtual tunnel endpoint devices comprising at least one of the one or more communication devices.

14. The non-transitory machine-readable medium of claim 13, wherein the overhead is a quantity of data used to encapsulate layer two network data units transmitted between the virtual tunnel endpoint devices.

15. The non-transitory machine-readable medium of claim 14, wherein the respective largest supported maximum transmission units are based on the overhead and a maximum transmission unit size supported by the network, wherein the maximum transmission unit size supported by the network is the network data unit transmission size limit, and wherein the network interconnects at least two of the virtual tunnel endpoint devices.

16. A data processing system, comprising:
   a memory; and
   a processor adapted to perform operations for managing a distributed system managed via subscriptions, the operations comprising:
      obtaining a subscription update request from a subscribed entity that receives computer implemented services from the distributed system, the subscription update request indicating deployment of additional resources for the distributed system;
      physically deploying, based on the subscription update request, one or more managed systems and one or more communication devices as the additional resources;
      prior to providing the computer implemented services using the physically deployed ones of the one or more managed systems and one or more communication devices:
         initiating cooperative communication limits analysis for the one or more managed systems and the one or more communication devices to identify a global maximum transmission unit, wherein the global maximum transmission unit specifies a maximum size for all network data units to be generated by one or more network data unit processors of the one or more managed systems, and
         configuring one or more network data unit processors of the one or more managed systems to only generate the network data units such that each of the generated ones of the network data units is equal to or smaller than the global maximum transmission unit; and
      providing the computer implemented services to the subscribed entity using, in part, communications generated by the configured one or more managed systems and the one or more communication devices to comply with the subscription update request.

17. The data processing system of claim 16, wherein the cooperative communication limits analysis comprises:
   initiating, by a portion of the one or more managed systems and the one or more communication devices, calculation of a largest supported maximum transmission unit based, at least in part, on overhead of a communication scheme used to transmit the communications;
   advertising, by the portion, the largest supported maximum transmission unit calculated by each device of the portion; and
   selecting, by the portion, one of the respective largest supported maximum transmission units that is supported by all devices of the portion as the global maximum transmission unit.

18. The data processing system of claim 17, wherein the portion comprises virtual tunnel endpoint devices, the virtual tunnel endpoint devices providing connectivity between layer two networks that service corresponding portions of the one or more managed systems, and the virtual tunnel endpoint devices comprising at least one of the one or more communication devices.

19. The data processing system of claim 18, wherein the overhead is a quantity of data used to encapsulate layer two network data units transmitted between the virtual tunnel endpoint devices.

20. The data processing system of claim 19, wherein the respective largest supported maximum transmission units are based on the overhead and a maximum transmission unit size supported by the network, wherein the maximum transmission unit size supported by the network is the network data unit transmission size limit, and wherein the network interconnects at least two of the virtual tunnel endpoint devices.

\* \* \* \* \*